US007068888B1

(12) United States Patent
Dragone

(10) Patent No.: US 7,068,888 B1
(45) Date of Patent: Jun. 27, 2006

(54) EFFICIENT WAVEGUIDE ARRAYS WITH OPTIMIZED MATCHING TRANSITIONS

(76) Inventor: Corrado Pietro Dragone, 43 Windsor Dr., Little Silver, NJ (US) 07739

(*) Notice: Subject to any disclaimer, the term of this patent is extended or adjusted under 35 U.S.C. 154(b) by 0 days.

(21) Appl. No.: 11/080,255

(22) Filed: Mar. 15, 2005

(51) Int. Cl.
*G02B 6/26* (2006.01)
*G02B 6/42* (2006.01)

(52) U.S. Cl. .............................. 385/39; 385/43; 385/46
(58) Field of Classification Search ................... 385/39, 385/42–46
See application file for complete search history.

(56) References Cited

U.S. PATENT DOCUMENTS

| | | | |
|---|---|---|---|
| 5,002,350 A | 3/1991 | Dragone | |
| 5,136,671 A | 8/1992 | Dragone | |
| 5,745,618 A | 4/1998 | Li | |
| 6,058,233 A | 5/2000 | Dragone | |

OTHER PUBLICATIONS

Corrado Dragone, "Optimum Design of a Planar Array of Tapered Waveguides", reprinted from Journal of the Optical Society of America, vol. 7, No. 11, Nov. 1990, pp. 2081-2093.
Corrado Dragone, "Theory of Wavelength Multiplexing with Rectangular Transfer Functions", IEEE Journal of Selected Topics in Quantum Electronics, vol. 8, No. 6, Nov. 2002, pp. 1168-1178.
Corrado Dragone, "Planar Waveguide Array with Nearly Ideal Radiation Characteristics", Electronic Letters, vol. 38, No. 16, Aug. 2002, pp. 880-881.

*Primary Examiner*—Sung Pak
*Assistant Examiner*—Tina M Wong

(57) ABSTRACT

An optical interconnection apparatus including waveguide arrays such as waveguide lenses, waveguide gratings and star couplers, has improved efficiency realized using a periodic array combined with an arrangement of matching sections. The array is connected to a slab region containing the array focal point and the purpose of the matching sections is to minimize unwanted radiation by the array outside the central zone of the array. This unwanted radiation is primarily caused by two particular unwanted modes excited at the array junction with the slab, and the resulting loss is minimized by properly choosing the average phase shift applied by each section to said unwanted modes.

14 Claims, 18 Drawing Sheets

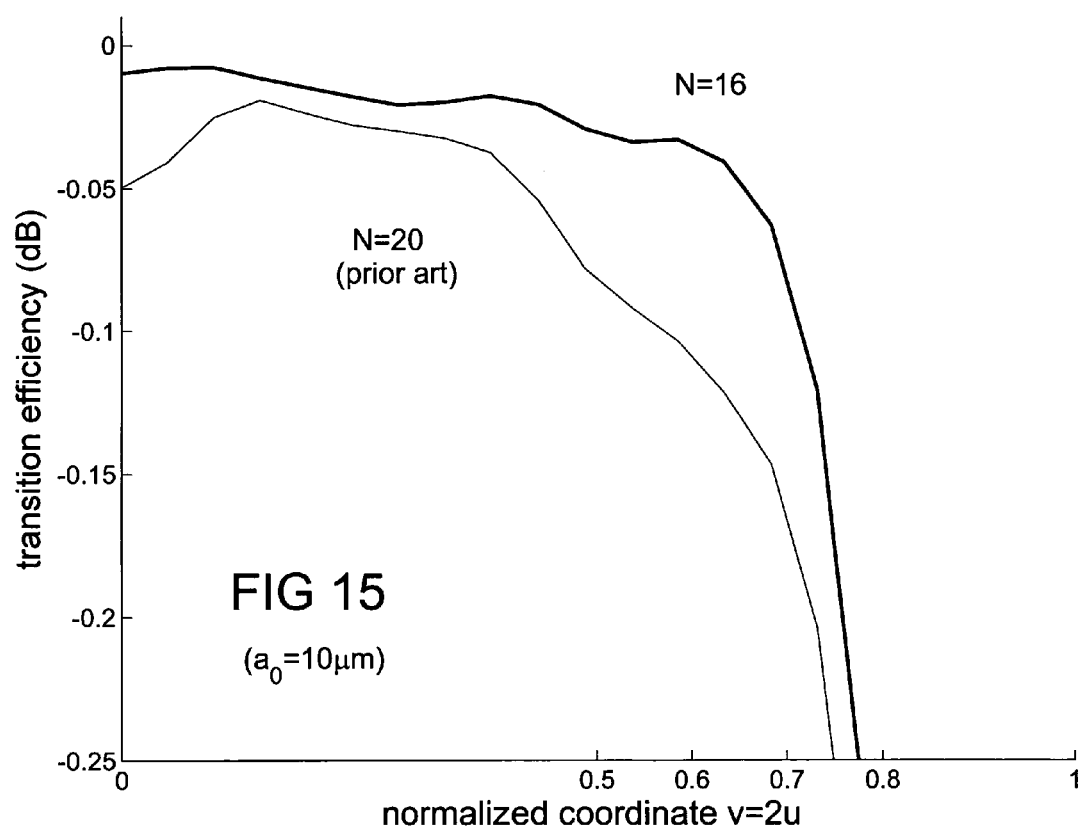

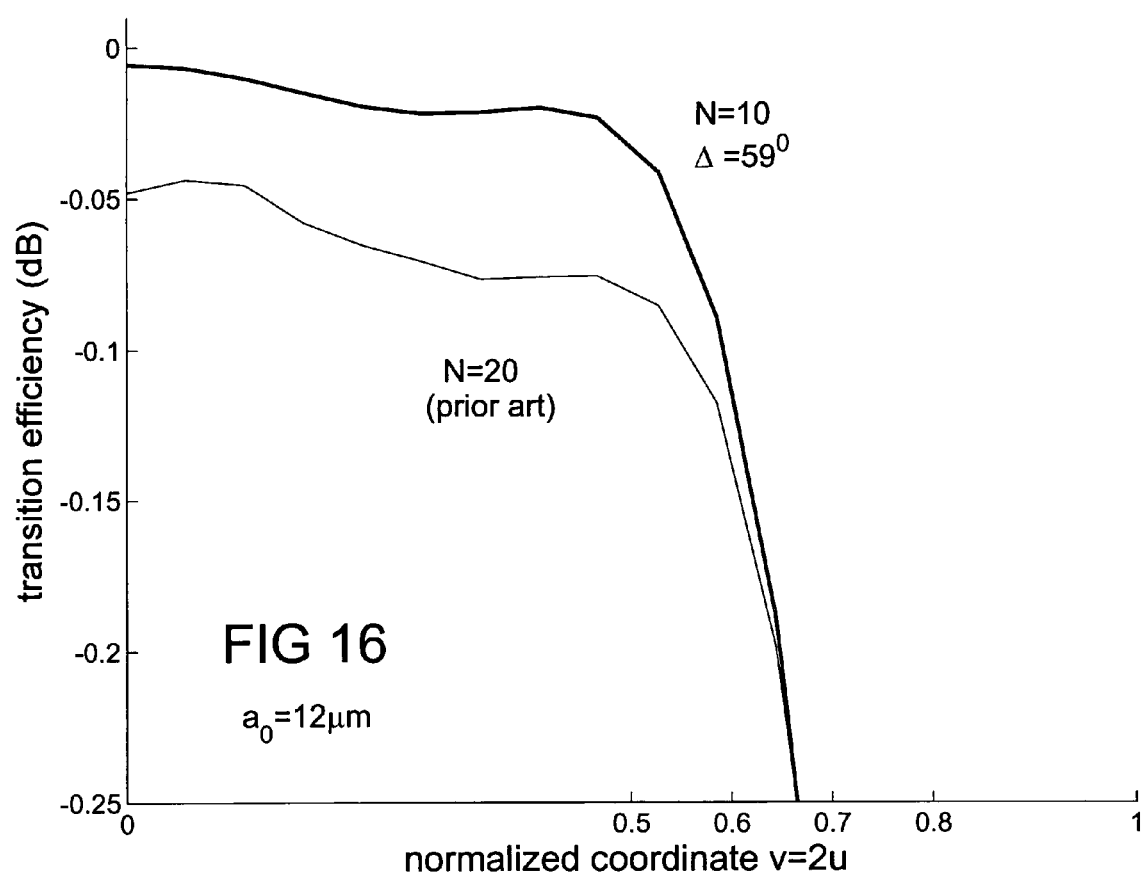

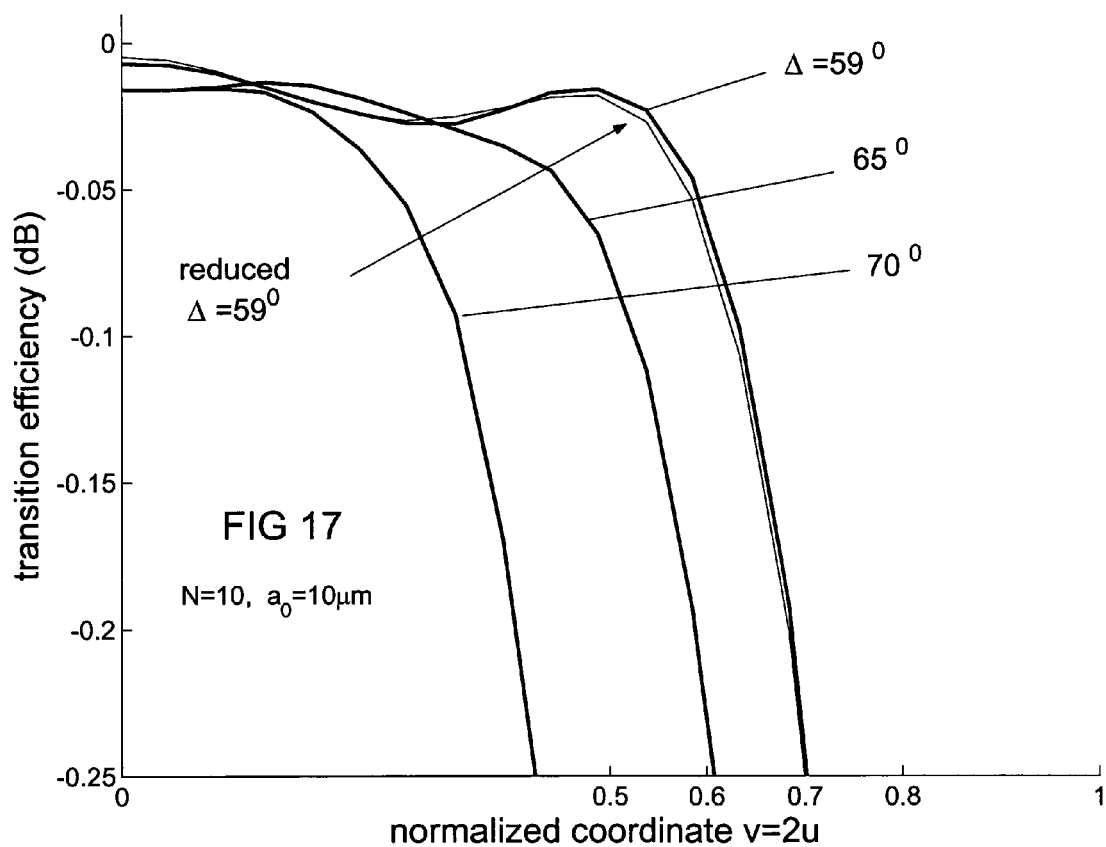

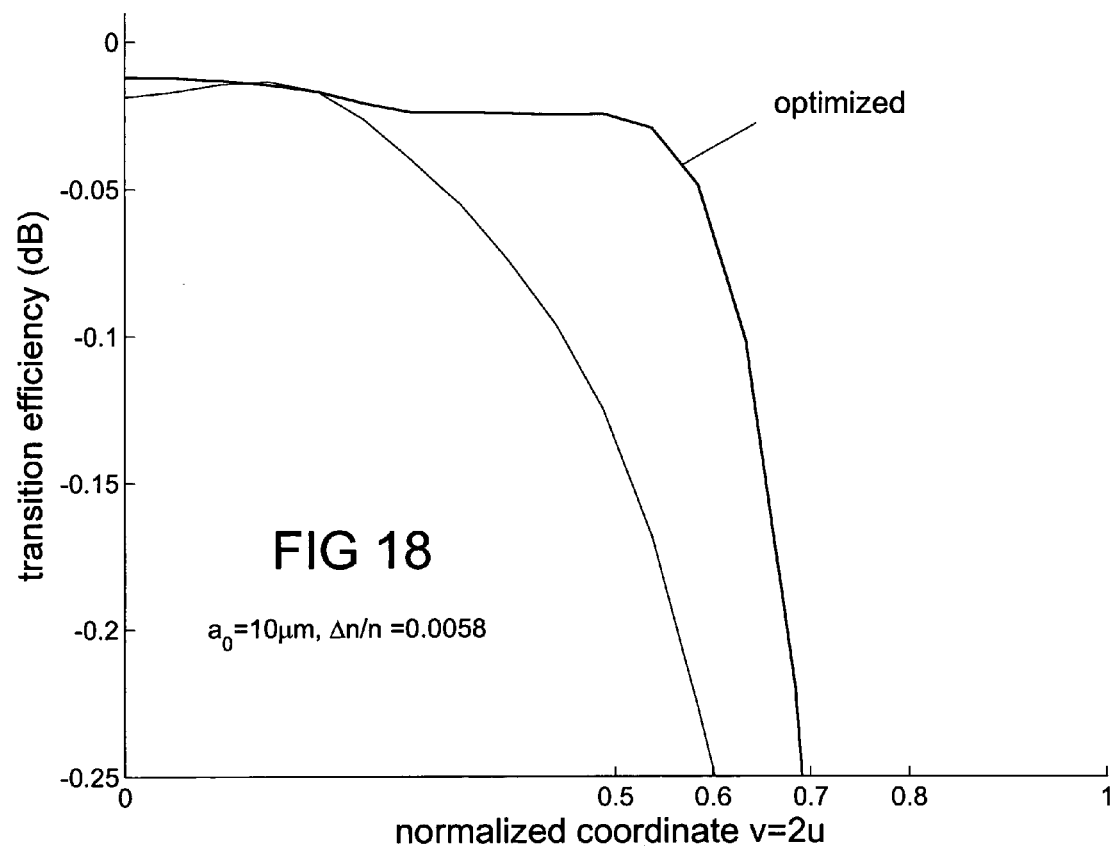

EFFICIENT WAVEGUIDE ARRAYS WITH OPTIMIZED MATCHING TRANSITIONS

FIELD OF THE INVENTION

This invention relates to waveguide arrays in optical systems, and more particularly, to waveguide arrays having improved efficiency for wavelength routers and star couplers in integrated optics.

BACKGROUND OF THE INVENTION

Waveguide arrays are used optical wavelengths to realize imaging lenses and gratings in wavelength routers. One such wavelength grating router is described in U.S. Pat. No. 5,136,671, issued on Aug. 4, 1992. As shown in FIG. 1, this router is an imaging arrangement formed by a waveguide grating and it is generally composed of two dielectric slabs, 101 and 102, two periodic arrays 103 and 104, and a set of waveguides (grating arms), 105, of different lengths between the two arrays. Typically, in commercial routers the loss exceeds 3 db for the central ports of the router and, for the marginal ports it often exceeds 6 db. Such losses seriously limit the usefulness of the router for passive networks and applications such as channel dropping filters with stringent requirements on loss uniformity. It is generally important to improve uniformity, by reducing the difference between maximum and minimum loss. The above loss variation is primarily caused by the two periodic arrays connected to the waveguides forming the grating. It is caused by scattering at the two junctions where the radial waveguides of the two periodic arrays connect to the input and output slabs. Efficient router arrays are currently realized by means of transitions that are difficult to realize with low loss because this would require small gaps 110, between adjacent waveguides. This loss is often reduced by using segmented transitions but these transitions currently require a large number of sections and they are afflicted by appreciable residual loss. Thus, there is continuing need to reduce this loss and its uniformity.

SUMMARY OF THE INVENTION

The present invention, efficient waveguide arrays with optimized matching transitions, provides low loss imaging by using waveguide arrays. A planar array of radial waveguides has improved efficiency realized by combining the array with a segmented arrangement of matching sections. The array is connected to a slab waveguide, containing the array focal point, and the purpose of the matching sections is to substantially improve the efficiency of power transfer to the vicinity of the focal point. Without matching sections, substantial loss would be caused by power transfer from the fundamental mode to two particular unwanted modes of the slab, namely the two modes with the closest propagation constants to the fundamental mode. Accordingly, my invention essentially eliminates this loss by including between the array and the slab a suitable number of matching sections The above two unwanted modes approximately have the same propagation constant. Accordingly, in one embodiment, the matching sections are approximately characterized by a constant phase shift produced in each matching section by the average difference in propagation constant between the two unwanted modes and the fundamental mode. The optimum phase shift that must be produced by each section is shown to depend on the number of sections and it must satisfy one of the following two conditions. The first condition applies when only a few sections are used (for instance less than 5) and it requires the phase shift to be greater than 110°. The latter condition applies when the number sections exceeds a certain value (for instance 4) and it requires the phase shift to be comprised between 50° and 90°.

BRIEF DESCRIPTION OF THE DRAWINGS

In the drawings,

FIG. 15 shows a comparison for $a_0=10$ µm, $\Delta n/n=0.0058$ between the new technique for N=20 and the prior art for N=20.

FIG. 16 shows a comparison for $a_0=12$ µm, $\Delta n/n=0.0058$ between the new technique for N=10 and the prior art for a larger N=20.

FIG. 17 shows that the width $v_0$ realized for N=10, $\Delta=59°$ is substantially reduced if $\Delta$ is appreciably greater than the optimum value.

FIG. 18 shows the loss increase for $a_0=10$ µm, $\Delta n/n=0.0058$, N=10 when a transition designed for $R_0=\infty$ is combined with an array characterized by $R_0=3500$ µm.

DETAILED DESCRIPTION OF VARIOUS ILLUSTRATIVE EMBODIMENTS

Figure 1:
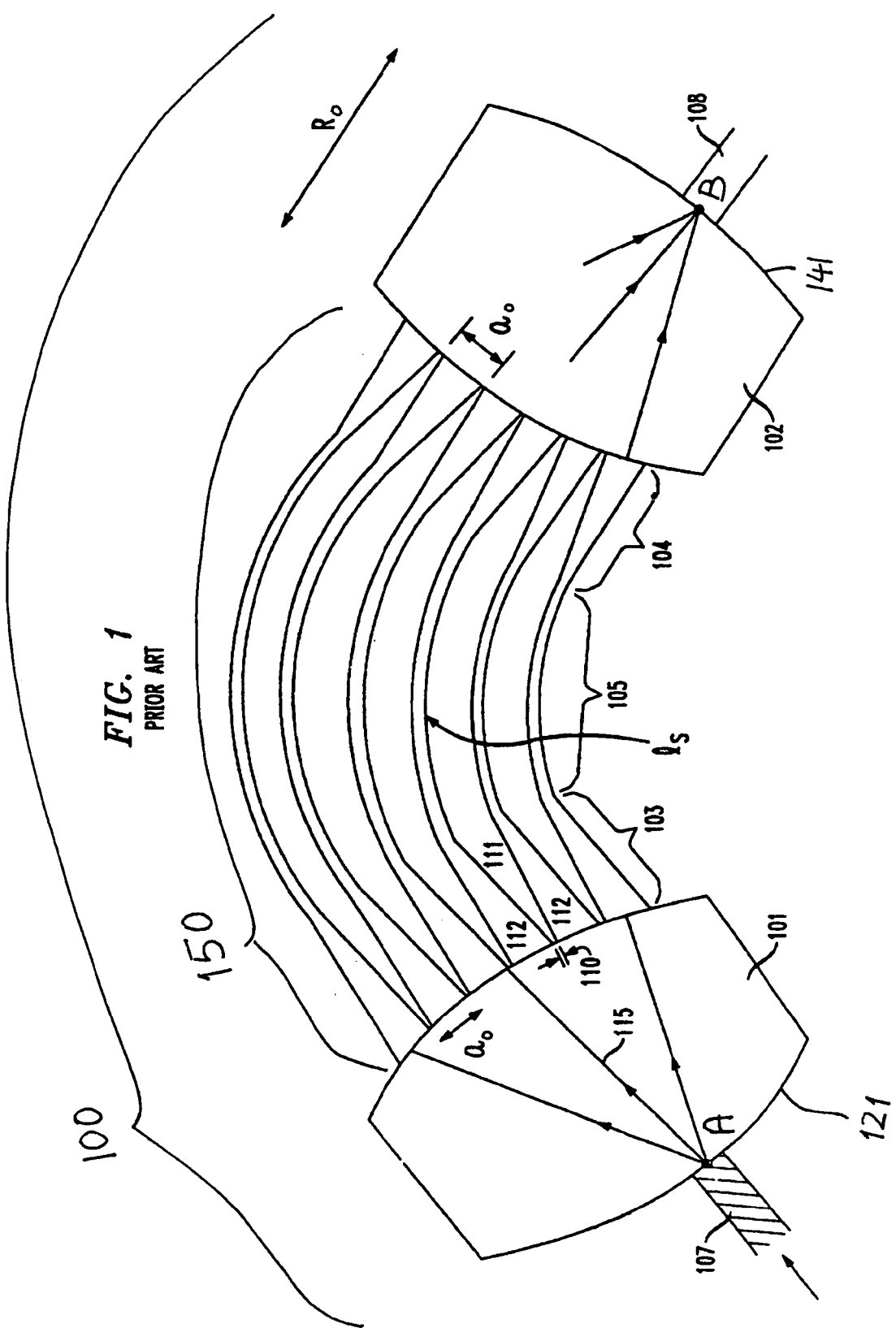
FIG. 1 illustrates the basic prior art form of optical wavelength router or grating.

In the following description, identical element designations in different figures represent identical elements. Additionally in the element designations, the first digit refers to the figure in which that element is first located (e.g., 102 is first located in FIG. 1).

The present invention, efficient waveguide arrays with optimized matching transitions, provides low loss imaging by using waveguide arrays. A planar array of radial waveguides has improved efficiency realized by combining the array with a segmented arrangement of matching sections. The array is connected to a slab waveguide, containing the array focal point, and the purpose of the matching sections is to substantially improve the efficiency of power transfer to the vicinity of the focal point. Without matching sections, substantial loss would be caused by power transfer from the fundamental mode to two particular unwanted modes of the slab, namely the two modes with the closest propagation constants to the fundamental mode. Accordingly, my invention essentially eliminates this loss by including between the array and the slab a suitable number of matching sections The above two unwanted modes approximately have the same propagation constant. Accordingly, in one embodiment, the matching sections are approximately characterized by a constant phase shift produced in each matching section by the average difference in propagation constant between the two unwanted modes and the fundamental mode. The optimum phase shift that must be produced by each section is shown to depend on the number of sections and it must satisfy one of the following two conditions. The first condition applies when only a few sections are used (for instance less than 5) and it requires the phase shift to be greater than 110°. The latter condition applies when the number sections exceeds a certain value (for instance 4) and it requires the phase shift to be comprised between 50° and 90°.

The two conditions can be explained as follows. If the number of sections is small, the loss is primarily caused by the first two unwanted modes and the phase shift in this case must exceed 110°. On the other hand, if the number of sections is large enough, then additional modes become important and the phase shift must then be comprised between 50° and 90°. In the simplest embodiment, the transition simply consists of a sequence of sections with each section approximately producing the same phase shift, whose optimum value is found to satisfy one of the above two conditions, and it is typically close to either 140° or 60°. In the most general embodiment, a low loss transition satisfying one of the above two conditions is realized by allowing the phase shifts to vary along the transition. In particular, if the number of sections is large, it is generally advantageous to reduce the phase shifts in the central region of the transition. Important applications of this array include star couplers and wavelength routers.

Router Description

FIG. 1 shows the basic structure of a prior art imaging arrangement 100 involving periodic arrays of the form used in this invention. Note the imaging arrangement will also be referred to herein as a router. The imaging arrangement 100 is described in U.S. Pat. No. 5,002,350 which issued on Mar. 26, 1991, U.S. Pat. No. 5,136,671 which issued on Aug. 4, 1992 and U.S. Pat. No. 6,058,233 which issued on May 2, 2000 and are incorporated by reference as if set out in full.

The imaging arrangement 100 includes an input section 101 and an output section 102 spaced apart and interconnected by a grating 150 consisting of an appropriate plurality of optical waveguide arms 105 connected between two periodic arrays of radial waveguides. The input and output sections typically are each free-space slabs, such as star couplers, and the arrangement has the property that wave energy applied by an input waveguide 107 acting as a point source A forms a plurality of output images, of which four are shown as $B_0, B_1, B_2, B_3$ in FIG. 2. The optical waveguide arms 105 typically are thin narrow layers (planar strips) of silica core supported on a planar silicon wafer, as known in the art.

In a conventional imaging arrangement or router, the input and output ports are connected to the input and output sections 101 and 102 along portions of two circles that are typically referred to as the input 121 and output 141 circles. For simplicity, FIG. 1 shows only one input 107 and one output 108 port.

The result is a router that produces a wavelength dependent output image of each input signal. The location of each output image is determined by its wavelength $\lambda$ and therefore, signals of different wavelengths from a particular input port give rise to separate images that can be received by different output ports. Typically optical fibers are used for applying input signals to the input ports and for extracting output signals from the output ports. In practice, several output ports will be needed, if the router is to send signals to different destinations. Similarly, several input ports will be needed, in order to receive signals from different inputs. In wavelength division optical networks, the different wavelengths would represent different communication channels.

The properties of the arrangement of FIG. 1 are best described next by considering its imaging properties in response to an input signal of variable wavelength $\lambda$ applied to the input waveguide 107. The input signal in FIG. 1 is radiated from the waveguide location towards the receiving apertures of the radial waveguides 103 connected to the arms 105 forming the grating 150. As discussed earlier, there would be an appropriate number of arms in the grating 150. At a particular input wavelength, each arm receives a component of the input signal. The signal is therefore split into many components, each traveling along a particular arm. Each arm applies to its component an appropriate phase shift, which is wavelength dependent, and it is proportional to the optical path length of the arm. In a conventional router, successive arms are characterized to a good approximation by a constant path length difference. Then, one finds that the various signal components radiated by the arms towards the output curve, all add in phase at certain locations on the output curve 241 shown in FIG. 2. As a result, several images $B_0, B_1, B_2$, etc of the input signal are produced on the output curve 241. These images represent different orders of the grating and they have three basic properties. First, their locations vary with the wavelength $\lambda$. Second, their intensities also vary, and they are determined by the radiation characteristics of the periodic array 204. Third, the images are equally spaced with spacing $\Omega$ determined by the angular spacing $\alpha$ of the array elements, $$\Omega = \frac{\lambda}{\alpha}$$

Of greatest importance in a conventional router is the central image $B_0$ of highest intensity. This is the image closest to the focal point F of the arms and it is called the principal image. This image is produced inside the central zone, which is an interval 242 of width Ω centered at F. The remaining images (higher orders) such as $B_1, B_2$ are produced outside the central zone. These images typically have appreciably smaller intensity in all cases except when they are close to the boundaries $P_1, P_2$ of the central zone.

Figure 2:
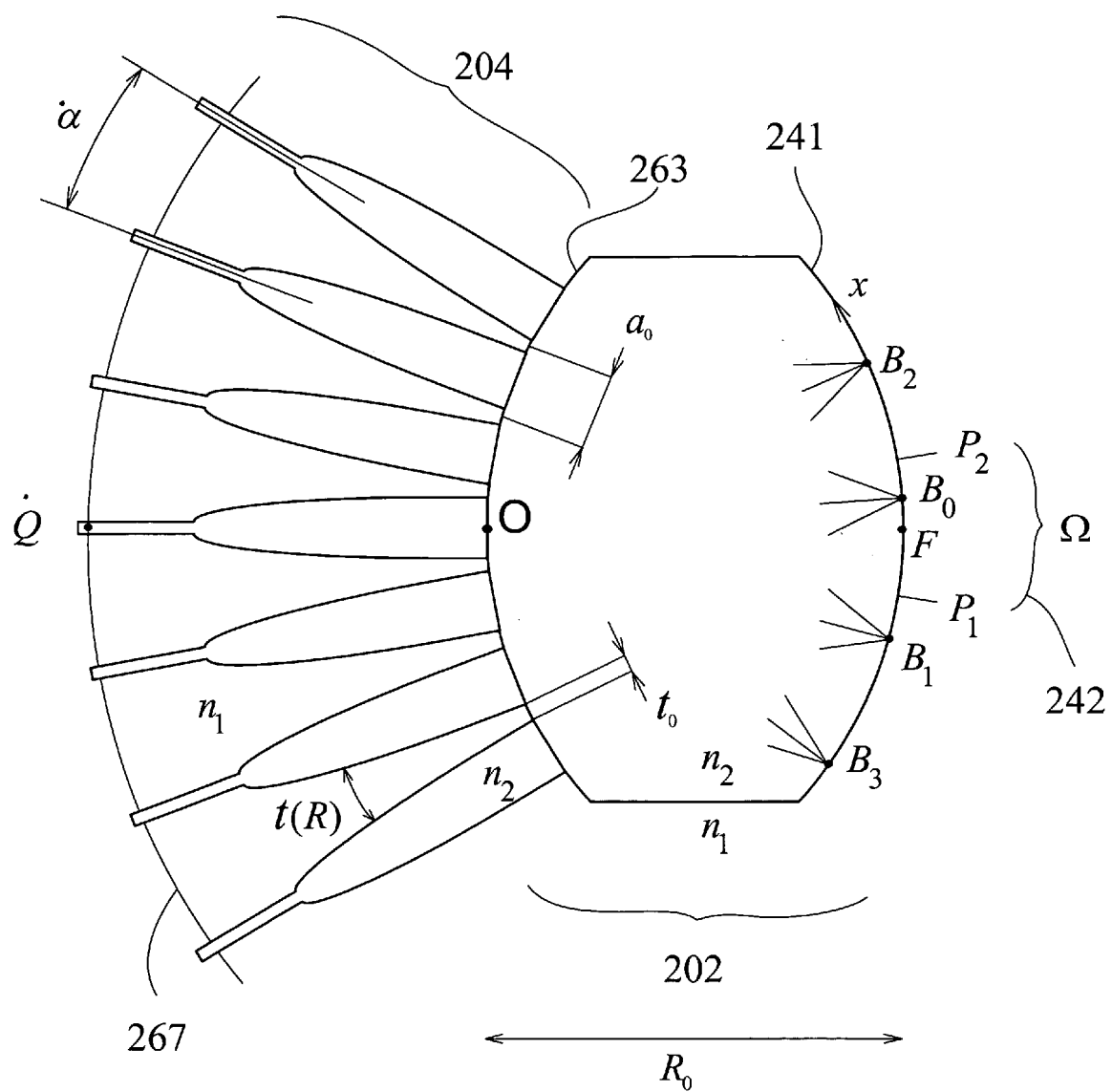
FIG. 2 shows an arrangement consisting of a dielectric slab waveguide connected to a conventional array of radial waveguides with virtual focal point F.

In a conventional router, all the output ports or waveguides are located inside the central zone (which in FIG. 2 represents the field of view $P_1, P_2$ of the router) and receive only the images produced in the central zone. In FIG. 1, only one output waveguide 108 is shown for simplicity, and the input signal is efficiently transmitted to this waveguide at those wavelengths for which the principal image location coincides with the particular waveguide location B. As pointed out earlier, $B_0$ is defined as the particular image inside the central zone $P_1, P_2$. Therefore the variation of $B_0$ is a periodic (cyclic) function of the signal wavelength. In each period, the variation exactly covers the entire central zone $P_1, P_2$. As a result, the transmission coefficient has periodic behavior consisting of equally spaced maxima. Each maximum corresponds to a wavelength for which the image $B_0$ coincides with the output waveguide location. The period, given by the wavelength spacing $\lambda_f$ between maxima, is called the free-spectral range. In a conventional router images produced outside the central zone (e.g., $B_1$ and $B_2$ of FIG. 2) are considered useless and so undesirable. Therefore, minimizing their intensities generally optimizes the router. To this purpose one must optimize the radiation characteristics of the periodic array 204, since these radiation characteristics affect the intensities of the various images. Here the radiating apertures of the arms are arranged periodically (with angular period 'α' in FIG. 2), thus forming a periodic array, and therefore each aperture produces the same radiation pattern, called the element pattern of the array.

The element pattern of a periodic array is simply [see Dragone, C., "Optimum Design of a Planar Array of Tapered Waveguides," J. Opt. Soc. Amer. A., Vol. 7, No. 11, pp. 2081–2093, November 1990 and Dragone, C. "Theory of Multiplexing with Rectangular Transfer Functions", IEEE Journal of Selected Topics in Quantum Electronics, Vol. 8, No. 6, pp. 1168–1178, November. 2002] the power density produced on the focal circle, by applying unit power to one particular element (located in a period α). On the other hand, the array efficiency [see Dragone, C., "Optimum Design of a Planar Array of Tapered Waveguides," J. Opt. Soc. Amer. A., Vol. 7, No. 11, pp. 2081–2093, November 1990 and Dragone, C. "Theory of Multiplexing with Rectangular Transfer Functions", IEEE Journal of Selected Topics in Quantum Electronics, Vol. 8, No. 6, pp. 1168–1178, November. 2002] is obtained by simultaneously exciting all the array elements, with a constant phase difference between adjacent elements. Then, the efficiency E at any particular image location B is defined as the fraction, of the total power supplied to the array, that is transferred to that particular image location B. The efficiency E is a function of the image coordinate x on the output circle, and it is generally convenient to express this function in terms of the normalized coordinate u=x/Ω, where Ω is the central zone width and |x| is the distance from the focal point. For a periodic array, a remarkable property of the function E(u), describing the efficiency variation on the focal circle, is that that E(u) coincides with the array element pattern. That is, the problem of optimizing E(u) is identical to the problem of optimizing the element pattern. Ideally, one would like to design the array so that all secondary images are zero, in which case the element pattern becomes a rectangular function characterized by unity efficiency inside the central zone (the interval |u|<1) and zero outside, that is $$E(u)=\text{rect}(u)$$

Notice a simple relation exists between the efficiencies $E_0$, $E_1$, $E_2$, etc at the various locations $B_0$, $B_1$, $B_2$, etc. From power conservation, one can show that the loss Loss=1−$E_0$ at a particular location $B_0$ in the central zone is simply the sum of the powers $E_1, E_2$, etc transferred to secondary images. In a conventional array, the most important images with the greatest intensities are the principal image $B_0$ and the secondary image $B_1$ that is closest to the central zone. We call $B_1$ the first secondary image. Also important here are higher order images and, particularly, the second secondary image $B_2$. As shown later 99% of the loss is typically caused by the first two secondary images $B_1$ and $B_2$.

Figure 3:
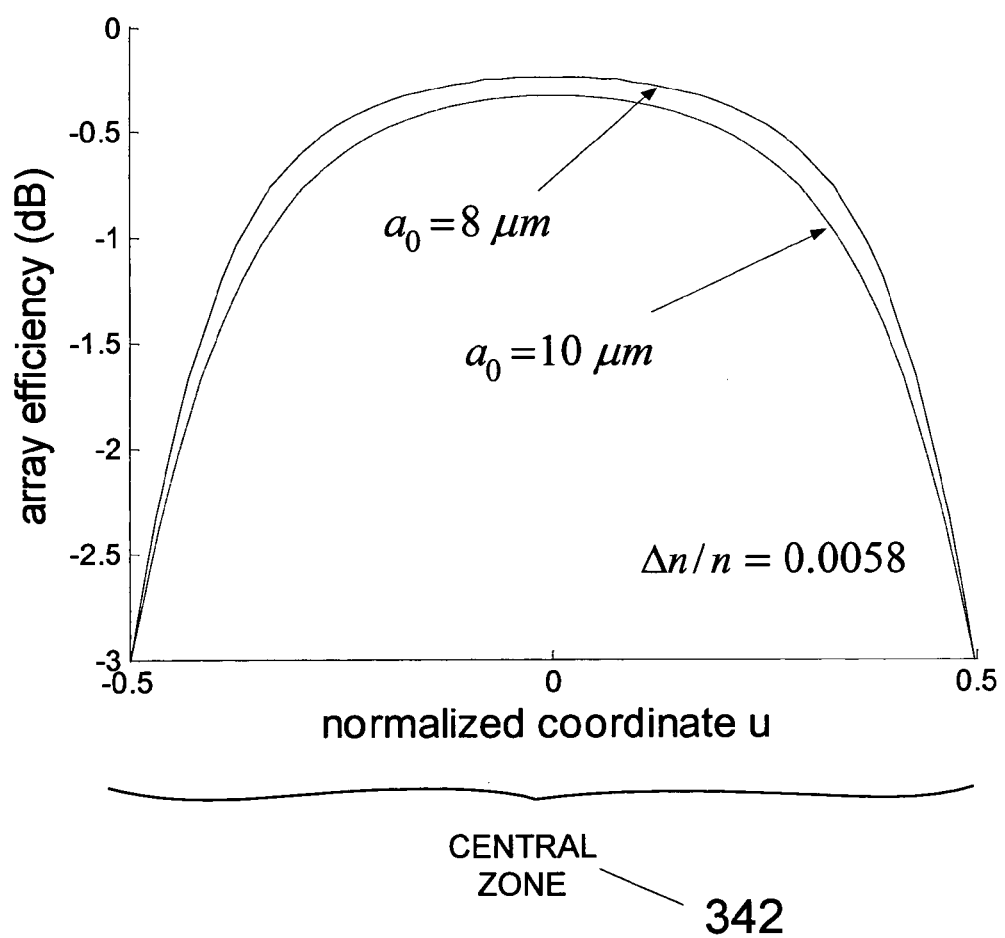
FIG. 3 shows typical losses for a conventional array without segmentation.
Figure 4:
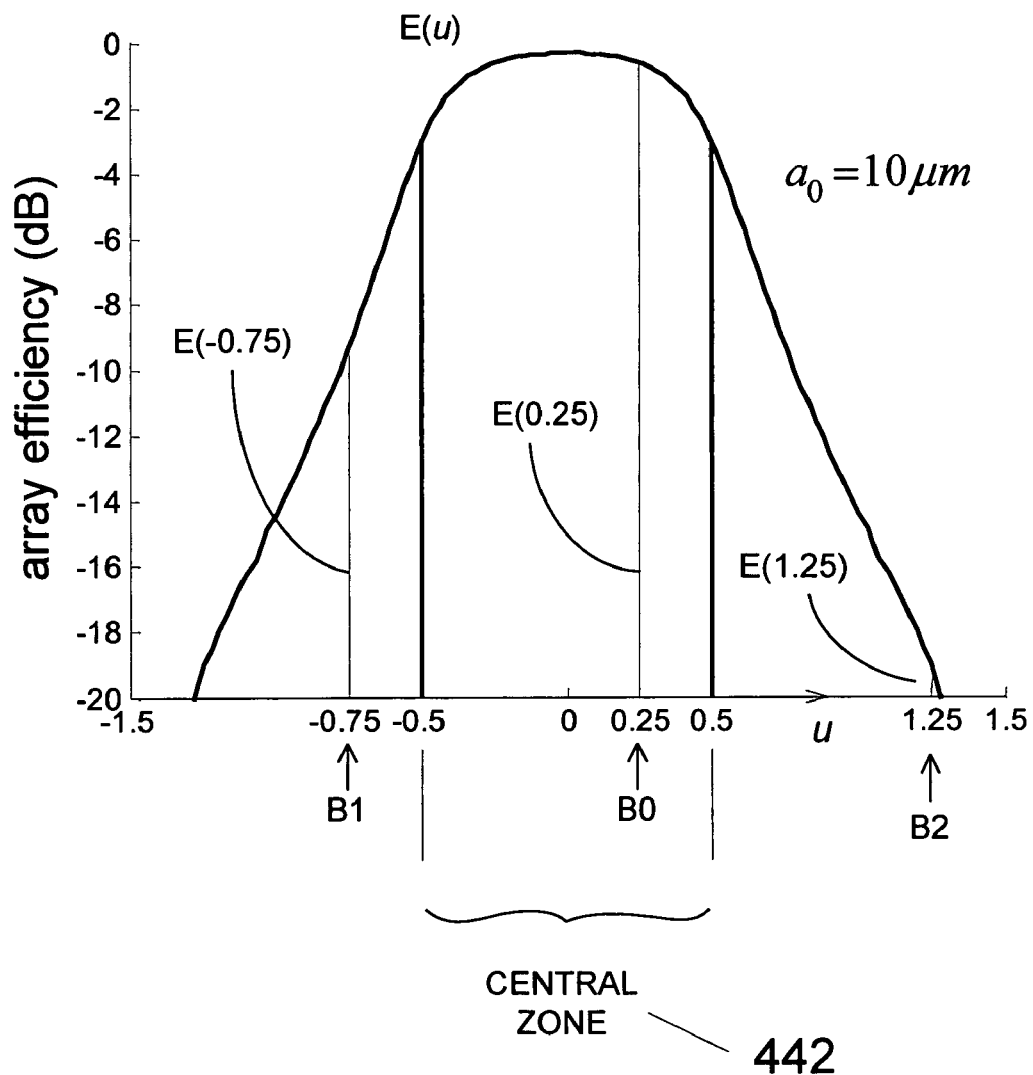
FIG. 4 shows that the loss in the central zone of a conventional array without segmentation is primarily caused by the first two unwanted images $B_1$ and $B_2$.

FIG. 2 shows in greater detail a prior art array formed by a periodic arrangement of radial waveguides with focal point F and angular spacing α between adjacent waveguides. The arrangement consists of strip waveguides that can be realized in integrated form by using for instance strips of silica core sandwiched between cladding layers of lower refractive index $n_1 < n_2$ where $n_2$ is the core index. The arrangement of FIG. 2 consists of an array combined with a dielectric slab 202 formed between two circles 263, 241, respectively through the array focal point and the center O of the array aperture. The array is realized between two concentric circles centered at the array focal point F. The first circle 267 is connected to the input waveguides (not shown). The second circle 263 contains the waveguides apertures. The array elements are simply guiding strips of higher (effective) refractive index $n_2$ separated by lower (effective) index $n_1$ forming the gaps between adjacent strips as shown in FIG. 2. By using this type of array, the efficiency in the central zone is maximized by using, between the above two circles, a gradual transition in which the gap t(R) is a monotonically decreasing function of the radial distance R from the focal point F. Indeed, if the transition is very gradual, and the gap gradually goes to zero, then one can show that the array element pattern will approach a rectangular element pattern. On the other hand, by using conventional silica waveguides, the final gap value at the end of the transition must realistically exceed about 3 microns. Then, the discontinuity caused by the nonzero gap at the array junction with the slab, is responsible for substantial loss, as shown by the two examples of FIG. 3. In both examples one can show that 99% of the loss at any particular location $B_0$ in the central zone is caused by the first two unwanted images $B_1, B_2$. For instance, one can verify that 99% of the loss for the image $B_0$ of coordinate u=0.25 in FIG. 4 is caused by the powers transferred to the images $B_1, B_2$ of coordinates u=−0.75, 1.25.

To summarize, in a conventional array with a nonzero gap value at the array junction 263 with the slab 202, the loss is primarily caused by the periodic discontinuity caused by the nonzero gaps at the junction 263. This loss was reduced previously [see Dragone, C., "Planar Waveguide Array with Nearly Ideal Radiation Characteristics", Electronics Letters, Vol. 38, No. 16, pp. 880–881, August 2002] by replacing each waveguide in FIG. 2 with a pair of waveguides. However, a limitation of that arrangement is that it typically requires a large array period. Moreover, that arrangement is afflicted by residual loss that is advantageously eliminated by the technique described here. The present technique is structurally identical to a previous technique known as segmentation, which is described in U.S. Pat. No. 5,745,618 which issued on Apr. 28, 1998. However previous segmentation requires a large number of segments of relatively small length. Here, the number of sections and the loss are substantially reduced by introducing a new design characterized by new conditions which minimize two particular unwanted modes.

Illustrative Embodiments

It is important to realize that imaging in FIG. 1 is performed by the supermodes of the grating [see Dragone, C. "Theory of Multiplexing with Rectangular Transfer Functions", IEEE Journal of Selected Topics in Quantum Electronics, Vol. 8, No. 6, pp. 1168–1178, November. 2002]. At any particular wavelength, the input waveguide in FIG. 1 can be viewed as a point source that approximately produces, in the first periodic array connected to the grating, a particular supermode, of eigenvalue determined by the point source location. In a router, the purpose of the grating is to change the input eigenvalue, thus producing a wavelength dependent eigenvalue at the input of the periodic array of FIG. 2. The supermode produced at the input of this array is simply a superposition of the individual modes of the input waveguides. The supermode excites the input waveguides in a linear phase progression, with a constant phase difference $\phi = 2\pi u$ determined by the mode eigenvalue, which determines the location of the principal image $B_0$ in the central zone. Indeed the central zone in FIG. 2 simply corresponds to the interval $|\phi|<\pi$ and therefore $u=\phi/\pi$ is simply equal to the normalized coordinate defined earlier as the distance (of the principal image $B_0$ from the focal point) divided by the central zone width $\Omega$. In the following, consideration will be restricted to positive values of $\phi$, since the array response is symmetric, and characterized by identical properties for negative $\phi$.

Figure 5:
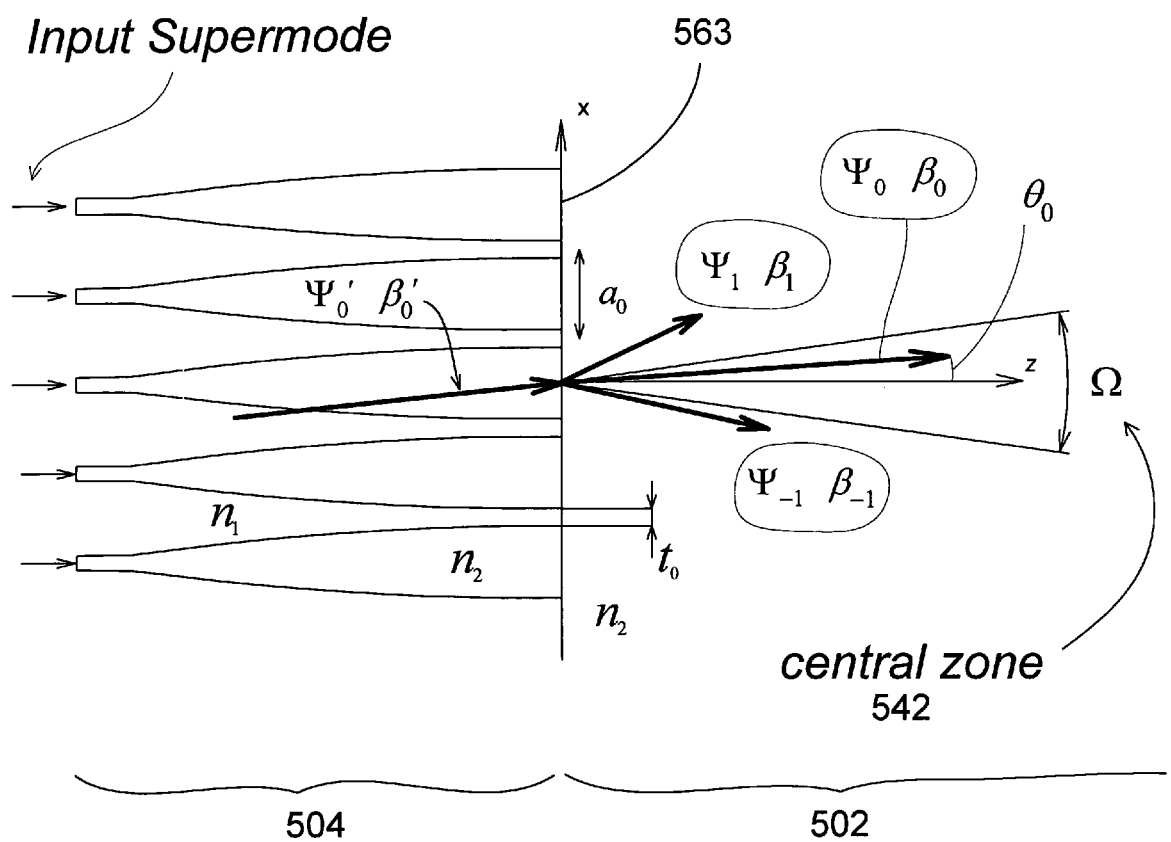
FIG. 5 shows a conventional array of long focal length. The loss at the array junction 563 with the slab 502 is primarily caused by power transfer from the incident mode $\Psi_0$ to the first two unwanted modes $\Psi_{-1}$, $\Psi_1$ of the slab.

As pointed out earlier, the loss in FIG. 2 is primarily caused by the nonzero gap $t_0$ at the array junction with the slab. The purpose of this invention is to minimize this loss by including between the array and the slab a suitable arrangement of matching sections. Without the matching sections, the junction discontinuity caused by the nonzero gap $t_0$ in FIG. 2 causes power transfer from the fundamental mode to unwanted modes, and each unwanted mode then contributes to a particular unwanted image, determined by the mode order. Notice each unwanted image $B_s$ is entirely caused by power transfer from the fundamental mode to a particular mode corresponding to $B_s$. Here the notation $\Psi_0$, $\Psi_{-1}$, $\Psi_1$ etc will be used for the supermodes corresponding respectively to the images $B_0$, $B_1$, $B_2$, etc for $\phi>0$. Therefore $\Psi_0$ is the fundamental mode, responsible for $B_0$, the next higher order mode $\Psi_{-1}$ is responsible for $B_1$, which is the closest unwanted image to the central zone, and so on. In order to minimize power transfer to the unwanted image $B_1$ one must minimize mode conversion to the corresponding unwanted mode $\Psi_{-1}$, and similarly for the other unwanted images. As pointed out earlier, the most important unwanted modes, causing the largest loss, are typically the first two $\Psi_{-1}$ and $\Psi_1$. These are the two modes with the closest propagation constants to the fundamental mode $\Psi_0$, and they correspond to the two secondary images $B_1$, $B_2$ that are closest to the focal point. These two modes are illustrated in FIG. 5, where for simplicity the focal length $R_0$ is assumed to be very large, and therefore the waveguides are shown parallel to the array axis (notice, however, that the following considerations equally apply when $R_0$ is not large). In this figure $\Psi'_0$ denotes the incident mode illuminating the junction discontinuity and ideally one would like the entire incident power to be transferred to the fundamental mode $\Psi_0$ of the slab. Instead, as shown by FIGS. 3, 4, a substantial fraction of the incident power is transferred to unwanted modes. Moreover, as pointed out earlier, 99% of the loss is typically caused by the first two unwanted images, corresponding to the two unwanted modes $\Psi_{-1}$, $\Psi_1$ of the slab.

Notice the slab modes in FIG. 5 are simply plane waves, and their propagation constants $\beta_0$, $\beta_{-1}$, $\beta_1$, etc are given by a well known expression, namely $$(\beta_s a)^2 = (ka)^2 - (s2\pi + \phi)^2, \quad (s=0, \pm 1, \pm 2, \text{etc}) \quad (1)$$

where $\phi$ is the eigenvalue of the incident mode. From this expression, one can see that $\beta_{-s} = \beta_s$ for $\phi = 0$. Therefore, at the center of the central zone, the two modes $\Psi_{-1}$, $\Psi_1$ have the same propagation constant. Moreover, taking into account that typically $ka \gg 1$, one can verify from the above expression that the difference in propagation constant between each unwanted mode and the fundamental mode is accurately given by $$\Delta\beta_s \approx \frac{4\pi s(s\pi + \phi)}{2ka^2} \quad (a = \text{array period}) \quad (2)$$

and therefore for the two modes $\Psi_{-1}$, $\Psi_1$ the average value of $\Delta\beta_{-1}$, $\Delta\beta_1$ is simply $$\frac{\Delta\beta_{-1} + \Delta\beta_{-1}}{2} = \frac{2\pi^2}{ka^2}$$

which is independent of $\phi$. Similar results are also obtained for the array modes $\Psi'_{-1}$, $\Psi'_1$ and in this case $$\frac{\Delta\beta'_{-1} + \Delta\beta'_{-1}}{2} = \rho' \frac{2\pi^2}{ka^2}$$

where the parameter $\rho'$ is close to unity and approximately independent of $\phi$ for small $\phi$. Notice, from the above two expressions, one can now determine the average phase shift $\Delta$ caused by a given propagation length $L$. For the two modes $\Psi_{-1}$, $\Psi_1$, the average value of $\Delta\beta_{-1}$, $\Delta\beta_1$, multiplied by $L$ gives the phase shift $$\Delta = \rho\pi\frac{\lambda L}{a^2} \text{ (radians)} \quad (3)$$

where $\rho=1$ in the slab region and, in the array region, $\rho$ is somewhat greater than unity. The above expression plays a basic role in our technique. Notice $\lambda$ in the above expression is the wavelength for a plane wave in the slab region (thus $\lambda$ is the wavelength in vacuum divided by the effective refractive index of the slab).

In the prior art, the array loss (caused by the array junction with the slab) has been reduced in the vicinity of the focal point (small $\phi$) by using a technique known as segmentation [see Y. P. Li, "Optical Device Having Low Insertion Loss", U.S. Pat. No. 5,745,618, Apr. 28, 1998] which can be summarized as follows. The loss at the junction discontinuity is caused by the nonzero gaps $t_0$ between the waveguides of the array. Ideally one would like to insert, between the array and the slab, a gradual transition where the gaps gradually go to zero, in which case the above loss would be substantially reduced. However, this is not generally feasible, since 3 microns is about the smallest gap value that can be used, while still insuring good uniformity of the glass flow in the gaps. On the other hand the gaps in the junction vicinity can be effectively reduced by segmenting the gaps. By this technique, illustrated in FIG. 6, the segmented region 605 is made up of N sections, each including two segments, respectively with zero and nonzero gaps, thus reducing the average gap value in each section. One can thus realize a segmented transition where the average gap value varies (in small steps) from the initial value of about 3 microns to the final zero value of the slab. On the other hand, in order for conventional segmentation to be effective, it requires a large number of sections, typically 20 or more. Moreover, conventional segmentation is typically afflicted by appreciable residual loss and, as pointed out later, it is inefficient when $R_0$ is small. These limitations are removed here by a new design that substantially reduces the number N of sections (N can then be less than 5) and typically produces negligible loss (a few hundreds of dB) in the vicinity of the focal point. Notice a long focal length $R_0$ is assumed for simplicity in FIG. 5 (the focal point is at infinity) and therefore the slab modes are plane waves, instead of radial waves, but the following considerations apply in general. Also notice, since the focal point in FIG. 5 is at infinity, in this case the distance of an image from the focal point is best defined as the angle from the axis (for instance, for the principal image, the angle shown as $\theta_0$) and $\Omega$ is then given by the angular aperture $\lambda/a_0$ of the central zone shown in FIG. 5.

Figure 6:
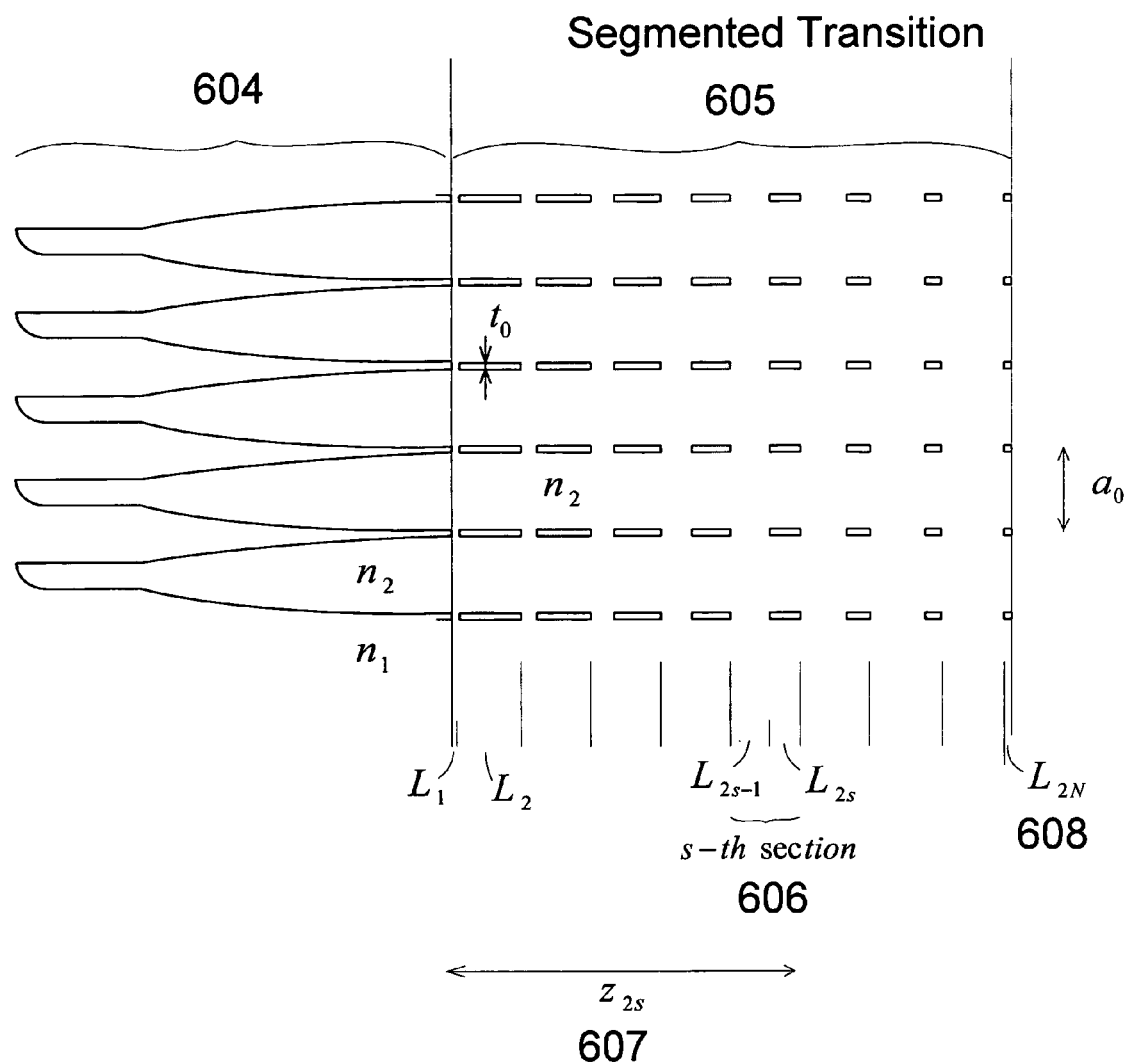
FIG. 6 shows a conventional array combined with a segmented transition.

Previous segmentation can be justified by noticing that if the separation of two consecutive discontinuities in FIG. 6 is small enough then the unwanted modes contributed by the two segments approximately cancel each other. Indeed the two discontinuities exactly cancel each other if their separation is zero. In view of this, we can say that a segmented transition simply consists of alternating discontinuities of opposite signs. A consequence of this property, which also plays an important role in our design, is the following result. By choosing the length $L_{2s-1}+L_{2s}$ of each section 606 small enough, one can show that each section becomes approximately equivalent to a section of uniform gap equal to the average gap of the actual two segments. The latter section will be called here the reduced section. Previously, the above equivalence was realized, approximately, by simply choosing the above length as small as possible. Then, however, the transition is characterized by a large number of sections, which can be substantially reduced by using the technique described here. Here, instead of requiring the length of each section to be small, we optimize the phase shifts Δ produced by the various sections. Once the phase shifts are optimized, they become close to one of the two values 145° or 60°, and very low losses can be realized with a relatively small number of sections. By this technique, both the number of sections and the loss are substantially reduced, as compared to previous transitions. The residual loss in the vicinity of the focal point is then primarily determined by the junction parameter $$V = \sqrt{\Delta n/n} \frac{a_0}{\lambda}$$

where the contrast $\Delta n = n_2 - n_1$ is determined by the (effective) refractive index difference, $n = (n_2+n_1)/2$ and $\lambda$ is the wavelength in the slab region. Note a large number of sections is generally undesirable because this will generally increase the losses. The increase is partly caused by unwanted radiation that is neglected here, since here the planar array is approximately represented (on its plane) by an effective refractive index distribution. In practice, therefore, additional losses will result because of radiation modes not included by the above representation and, as a consequence, substantially higher losses can occur if the number of sections is large.

Detailed Description of the Optimization

In a conventional array, the loss at the junction with the slab varies depending on the array period $a_0$ and the contrast determined by the (effective) refractive index difference $\Delta n = n_2 - n_1$. Typically, a relatively large period $a_0$, for instance more than 10 microns, is desirable in order to reduce mutual coupling between the array elements, since this simplifies the array design. On the other hand, here it is generally desirable to reduce the loss at the junction by choosing a smaller period, for instance 8 microns. Accordingly, we give a detailed description of both cases $a_0 = 8,10$ microns and assume $\Delta n/n = 0.0058$, but the design rules obtained in these two cases also apply to all cases of interest.

The purpose of this invention is to maximize the array efficiency in the central zone by using a suitable arrangement of matching sections. In order to minimize power transfer to the unwanted images $B_1$ and $B_2$ the transition must minimize mode conversion to the corresponding unwanted modes $\Psi_{-1}$ and $\Psi_1$, and similarly for the other unwanted images. As pointed out earlier, the most important unwanted modes, causing the largest loss, are the first two $\Psi_{-1}$ and $\Psi_1$. This can be seen from the results obtained by using a conventional array without matching sections. In the above two cases, one obtains the patterns of FIGS. 3,4 where it is recalled that $u=\phi/\pi$ is the normalized distance from the focal point divided by the central zone width $\Omega$. It is also recalled that the loss $1-E(u)$ in the central zone (the interval $|u|<0.5$) is the sum of the powers $E(u-1)$, $E(u+1)$, $E(u-2)$, etc transferred respectively to the unwanted modes $\Psi_{-1}$, $\Psi_1$, $\Psi_{-2}$, $\Psi_2$, etc. In both examples one can verify that 99% of the loss is caused by power transfer to the first two unwanted modes $\Psi_{-1}$, $\Psi_1$. Moreover, 90% of the power is transferred to the first unwanted mode if $|u|<0.25$. For this reason the loss can be substantially reduced in the vicinity of the focal point (small u) by simply using a few matching sections, properly chosen so as to minimize the two modes $\Psi_{-1}$, $\Psi_1$. Indeed, these two modes are characterized for u=0 by the same propagation constant. Moreover, since the arrangement is symmetric with respect to the longitudinal axis, only one of the two modes (the symmetric mode) is excited. As a consequence one can show that the loss for u=0 can be substantially reduced by only using one section. Once this result is obtained at the focal point for u=0, a similar result will obtained in the vicinity of the focal point. Indeed, by increasing the number N of sections, it is shown here that negligible loss can be realized over a finite interval whose width can be increased by increasing N. Notice, in the special case N=1, the transition consists of two segments, and it includes only three discontinuities. In this case the conditions that minimize the loss are readily determined. One finds that the loss for u=0 is zero to a first approximation (small contrasts) if the lengths of the two segments are properly chosen, so that the difference in propagation constant, between the above two unwanted modes and the fundamental mode, causes each segment to produce a phase shift of about 60°. This invention is essentially based on a generalization of this result.

As pointed out earlier the arrangement considered here is geometrically identical to the conventional segmentation. Thus, it consists of N sections, and each section consists of two segments, namely an array segment (with nonzero gaps) and a slab segment (with zero gaps). Here, however, we substantially reduce the number of sections, and also reduce the loss. In particular, negligible loss is typically realized in the vicinity of the focal point. The problem considered here is analogous to a previous problem in the prior art where a suitable matching transition is often needed to efficiently match two different waveguides. The problem, in general, is to minimize mode conversion from the fundamental mode to unwanted modes and, in many cases, the loss is primarily caused by a particular unwanted mode, which must be minimized in general over a finite bandwidth. An example, for instance, is the problem of minimizing reflections, in which case the unwanted mode has propagation constant opposite to $\beta_0$. Then the optimum transition simply consists of a sequence of N sections of the same length L, and the optimum length of each section is determined in a simple way by the difference in propagation constant $\Delta\beta$ between the fundamental mode and the unwanted mode. At the center of the specified bandwidth, the phase shift $$\Delta = \Delta\beta L \text{ (radiants)}$$

caused by $\Delta\beta$ must be approximately equal to 180°. The reason is simply that the transition in this case is a sequence of equally spaced discontinuities, and the total amplitude of the unwanted mode caused by the transition is approximately the sum of the contributions from the various discontinuities. Thus, by specifying $\Delta \approx \pi$ radiants, one finds that the various contributions approximately cancel each other over a finite bandwidth that can be increased (theoretically) as much as desired by increasing the number of sections. As a consequence, $\lambda/4$ sections are commonly used in the prior art to reduce reflections, since in this case the reflected mode has propagation constant opposite to the fundamental mode, and therefore the required length of each section is approximately $\lambda/4$ since $\Delta\beta = 2\beta_0$.

Here we use a similar approach to minimize the loss of our transition. However, the problem here differs from the above problem for several reasons. In the first place, as pointed out earlier, the transition is a sequence of discontinuities of alternating signs. That is, each discontinuity is followed by the opposite discontinuity, and each section actually consists of two segments. Therefore, in the special case where the transition consists of a single section, one finds that the optimum phase shift $\Delta$ is approximately equal 120°, in which case the three discontinuities (spaced by about 60°) approximately cancel each other (the contributions from three consecutive discontinuities of alternating signs approximately cancel each other if the discontinuities are spaced by 60°). Moreover, as the number of sections N is increased, the phase shift minimizing the loss increases, and it becomes approximately 140° for N=4. Notice these results for $N \leq 4$ are consequences of two properties. First, the loss for $N \leq 4$ is primarily caused by the first two unwanted modes $\Psi_{-1}$, $\Psi_1$. Second, the two modes are approximately characterized by the same propagation constant, in the central region of the passband. Because of the latter property, here the appropriate value of $\Delta$ is the average phase shift produced by the average value of $\Delta\beta$ for the two modes. One then typically obtains for $N \leq 4$ the condition $$120° < \Delta < 150° \quad (4)$$

as shown later. On the other hand, by increasing the number of sections, one finds that higher order modes become important and, as a result, the transition loss in the central region of the passsband can be substantially reduced (typically to a few hundredths of dB) by approximately choosing the condition $\Delta \approx 60°$ as shown later. Notice, if N is not much larger than 4, then both conditions give good results. The former condition results in a wider passband, whereas the latter conditions results in a smaller residual loss in the central region of the passband, as shown later. Both conditions optimize, in their vicinity, the transition performance. Notice, without matching sections, the array loss is an increasing function of the junction period $a_0$. More precisely, the loss is an increasing function of the junction parameter $$V = \sqrt{\Delta n/n} \frac{a_0}{\lambda} \quad (5)$$

as can be seen from FIG. 3 where the loss for $a_0=10$ μm is appreciably higher than for $a_0=8$ μm. A similar result is also true in general for our transitions, whose residual loss will generally increase (and the width $v_0$ for a given N will decrease) as a function of the above V-number. We next describe in greater details the new transition and its optimization.

Here we describe a new design that substantially reduces the total number of sections, and also reduces the loss in the central region of the passband interval $|\phi| < \phi_0$. The loss will always be an even function of $\phi$ and therefore consideration will be restricted to $$\phi \leq 0$$

Figure 7:
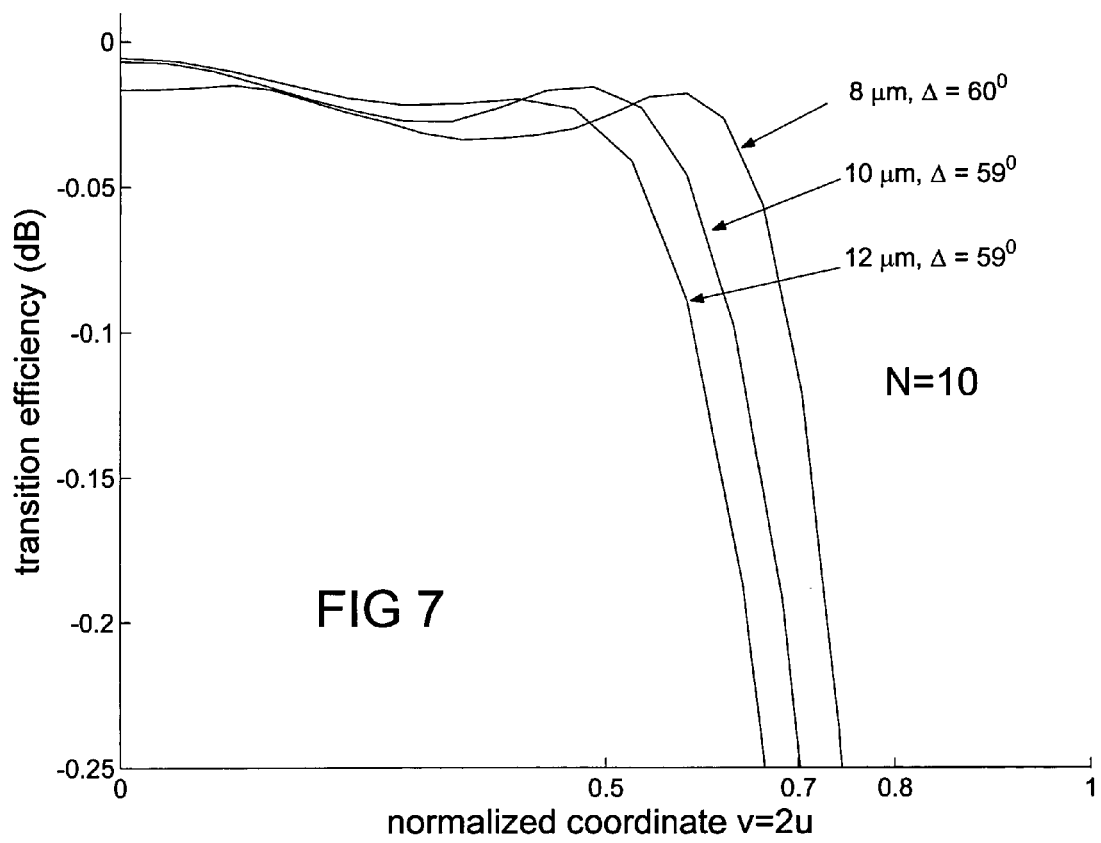
FIG. 7 shows the losses obtained for different periods $a_0$ by using in each case a constant $\Delta \approx 60°$ and N=10.

It will be often convenient to replace $\phi$ with the normalized parameter $v=|\phi|/\pi$. The passband then becomes the interval $0 < v < v_0$ and its width $v_0 = \phi_0/\pi$ represents the fraction, of the central zone width, that is covered by the passband. The loss will be required to be less than 0.25 dB in the passband, and it will also be required to be negligible (typically, appreciably less than 0.1 dB) in the central region of the passband. Notice, however, that these requirements can be modified without substantially affecting the basic design. Once the loss is minimized, the loss will be characterized by two distinct regions, namely a central region $0 < v \leq v_r$ of very low loss and a second (transition) region $v_r \leq v \geq v_0$ where the loss rapidly increases to 0.25 dB. FIG. 7 shows for instance the losses obtained for N=10 with different periods $a_0=8$, 10, 12 microns by using the simplest design, namely a constant A of about 60°. As expected the width $v_0$ increases as the period (which determines the V-number) is decreased. The largest width $v_0=0.744$ is obtained for $a_0=8$ microns, in which case the passband covers 74.4% of the central zone. In all cases $v_r > 0.75 v_0$ and therefore the loss is negligible over more than 75% of the passband. As shown later, the loss would increase significantly by using a conventional transition with twice as many sections.

As pointed out earlier, here the phase shift $\Delta$ produced by each section is determined by the average value of $\Delta\beta$ for the first two unwanted modes. In the examples considered here $\Delta\beta$ was calculated for the particular $v=v_r$ corresponding to the edge of the very low loss region. However, as pointed out earlier, an important property of $\Delta\beta$ is that it is approximately independent of v and, therefore, other choices of v (for instance a value smaller by a factor two) would not significantly affect the results. Notice the above definitions and assumptions can be changed without affecting the substance of the results.

For the type of transition considered here, the loss is primarily determined by the phase shifts produced by the various sections. The optimum values of these phase shifts do not strongly depend on the transition focal length, the period, or the contrast $\Delta n/n$. Once the phase shifts are known, the corresponding lengths of the various segments can be determined accurately as follows. It is recalled that each section consists of two segments with (slightly) different values of $\Delta\beta$. In the slab segment, the value of $\Delta\beta$ is independent of v and the phase shift is accurately given as pointed out earlier by $$ph \approx \pi \frac{\lambda L}{a^2} \text{ (slab segment)} \tag{6}$$

where L is the segment length and the array period a is a function of the radial distance R form the focal point, $$a = \alpha R = a_0 \frac{R}{R_0} \tag{7}$$

where $(\ )_0$ denotes the values at the transition input. In the array segment, on the other hand, $\Delta\beta$ has a slightly larger value and therefore $$ph' \approx \rho' \pi \frac{\lambda L}{a^2} \text{ (array segment)} \tag{8}$$

where the coefficient $\rho'$ is slightly greater than unity. For instance, in the examples considered later for $a_0=8$ and 10 microns, one obtains respectively $\rho' \approx 1.1$ and 1.2.

As shown later, good performance can be realized in all cases by simply choosing the same phase shift $\Delta$ for all sections. On the other hand, it will be shown that different phase shifts may be desirable in certain cases. In any case, it is important to realize that the various sections will generally have different lengths, and the lengths will vary depending on the focal length $R_0$. This dependence, which directly follows from the above three expressions, is an important difference between our technique and the prior art. The above dependence was ignored previously, since the transition was not optimized. This is an important limitation. In general, unless the focal length is sufficiently long, it is important (as shown later) to include in the design the above dependence, in order to insure very low losses over a substantial fraction of the central zone.

On the other hand, it is important to realize that the required phase shifts (but not the actual lengths) are essentially independent of the focal length $R_0$ and, therefore, the phase shifts can be accurately optimized by only considering the special case $R_0=\infty$, characterized by a constant period $a_0$ as in FIGS. 5, 6. Once the lengths of the various sections are calculated in this special case, their lengths for finite $R_0$ can be determined accurately as follows. Consider the j-th discontinuity, let $R_j$ be its focal distance, and let $z_j$ be its distance 607 from the transition input discontinuity. If then $(\ )_\infty$ denotes the value of $z_j$ calculated for $R_0=\infty$, its value for finite $R_0$ is accurately given by $$z_j = (z_j)_\infty \frac{R_0}{R_0 + (z_j)_\infty}, (j = 0, 1, \ldots, 2N) \tag{9}$$

where the index j varies between zero (at the input of the transition) and 2N. Also notice that the average value $a_j$ for the array period in the j-th segment is $$a_j = \frac{a_0}{R_0}[R_0 - (z_{j-1} + z_j)/2] \ (j = 1, \ldots, 2N) \tag{10}$$

which is needed in the two expressions (6, 8). Notice the entire transition is specified by the expression (9), once the values of $z_j$ are determined for $R_{0=\infty}$.

For each section, the effective gap value $t_{eff}=pt_0$ of the reduced section is accurately determined by the ratio $$p = \frac{ph'}{ph + ph'} = \frac{ph'}{\Delta} \tag{11}$$

where ph' is the phase shift produced by the array segment and $\Delta=ph+ph'$ is the total phase shift. In all cases the best results are realized when the effective gap of the s-th section is approximately a linear function of the section index s and the transition satisfies the condition $\Delta_s=\Delta_{N+1-s}$ which simply requires the same phase shift to be produced by sections symmetrically located with respect to the center. Both conditions will be assumed in the following examples, but the design can deviate from these conditions without affecting the substance of the results. Also notice, from the above expressions (6,8) specifying the phase shifts of the two segments in each section, $$\Delta \approx \rho \pi \frac{\lambda L}{a^2} \text{ (section of length } L) \tag{12}$$

where, since the two segments of each section are respectively characterized by $\rho=1$ and $\rho=\rho'$, the value of $\rho$ for the entire section is simply the average of the two values 1, $\rho'$ and therefore $$\rho=(1-p)+p\rho', \ (p=t_{eff}/t_0) \tag{13}$$

As pointed out earlier, the transitions considered here are optimized to a good approximation by simply choosing for the effective gap value $pt_0$ a linear function of the section index s. Then, according to the above expression (13), the parameter $\rho$ is also a linear function, which simply decreases linearly from the initial value $\rho=\rho'$ produced at the array junction, to the final value $\rho=1$ at the junction with the slab. The above results are important for they show that a simple relationship exists between the phase shift $\Delta$ and the length L. As pointed out earlier, the period a is a function of the radial distance from the focal point and, therefore, the above relationship is a function of the focal length. Notice $\lambda$ in the above expression (12) is the wavelength for a plane wave in the slab region (it is the wavelength in vacuum divided by the slab effective refractive index).

As pointed out earlier, good performance in all cases is realized by choosing a constant $\Delta$. On the other hand, the transition performance can be generally improved (to some extent) by using a more general design characterized by different phase shifts $\Delta_1$, $\Delta_2$, etc for the various sections. Again good results are obtained with the simplest design, namely by a symmetric design characterized by $\Delta_s = \Delta_{N+1-s}$. An important case arises when N is large. As shown later it is then advantageous to choose for the central sections of the transition smaller values of $\Delta$ than for the end sections. A good choice for $\Delta$ is a quadratic variation, between a maximum value close to 60°, and a minimum value typically greater than 45°. Then $$\Delta_s = \Delta_{N/2} + (\Delta_N - \Delta_{N/2})\left(\frac{2s-1-N}{1-N}\right)^2 \quad (s = 1, \ldots, N) \quad (14)$$

with $\Delta_{N/2} < \Delta_N$ and in all cases $$50° < \Delta_N < 90° \quad (15)$$

The optimization will be carried out under the constraint $$L_{2N} \geq 3.5 \text{ microns} \quad (16)$$

since 3.0 microns is about the smallest length that can be accurately realized without special techniques. However, this condition is only important if N is relatively large. If N is small, the optimization typically requires a value of $L_2N$ greater than 3.5 microns, and the above constraint can then be ignored. On the other hand, if the number of sections is large, one finds that it is important to reduce the effective gap in the last section. In this case, a small $L_2N$ is desirable and the constraint (16) is an important restriction. Notice the effective gap in the last section can be reduced by increasing $\Delta_N$. Therefore, the profile (14) has the important advantage of allowing the effective gap to be reduced (for a given $L_{2N}$) by increasing $\Delta_N$ (for instance from 60° to 75° as shown later in one of the examples) without increasing $\Delta_{N/2}$.

Next we describe in greater details the results obtained for $a_0 = 8,10$ microns. First consider $$a_0 = 8 \text{ microns}$$

Figure 8:
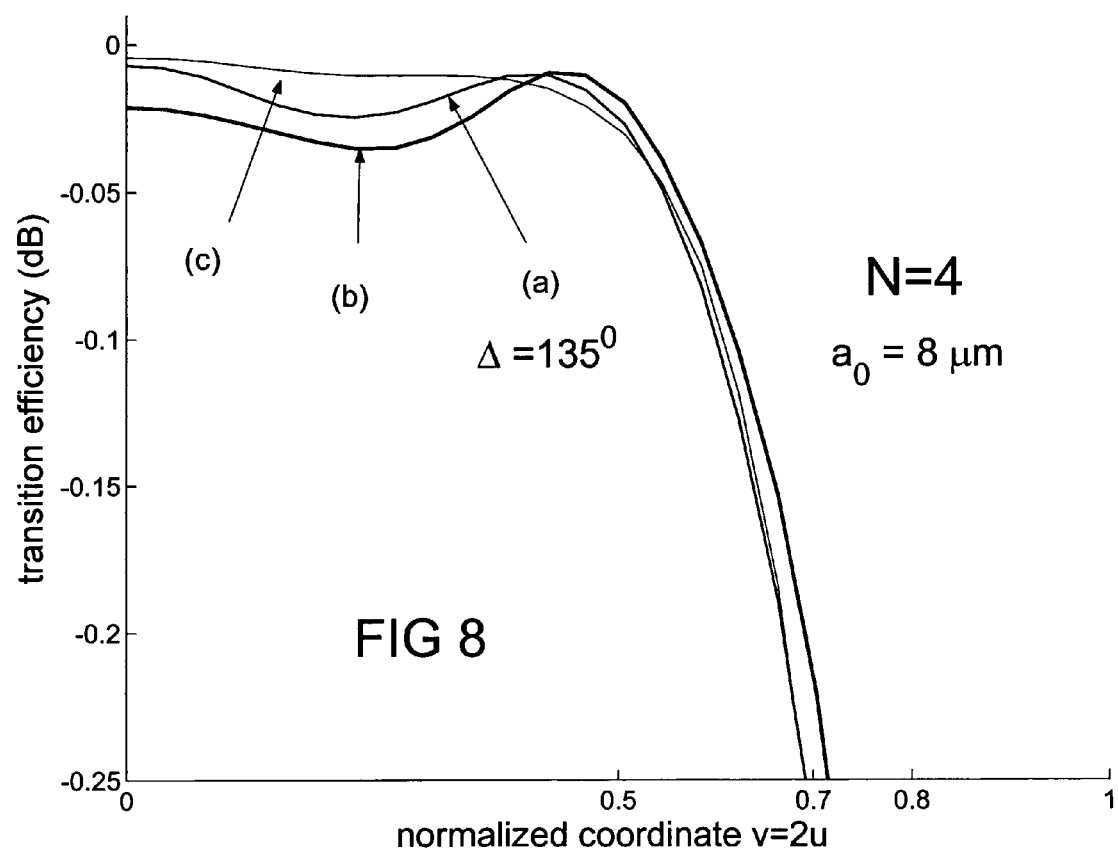
FIG. 8 shows several patterns for $a_0=8$ µm, N=4. Pattern (a) is realized using a constant $\Delta=135°$. Pattern (b) has increased width $v_0$ obtained by using different $\Delta$ for the various sections, in which case the average value of the optimized values of $\Delta$ is again found to be 135°. Pattern (c) gives the efficiency of the reduced transition corresponding to case (b)

As pointed out earlier the loss can be substantially reduced for small $v_0$ by simply using a few sections, with their phase shifts properly chosen so as to minimize the two modes $\Psi_{-1}$, $\Psi_1$. Moreover, the required phase shift $\Delta$ is close to 120° for N=2, in which case the three discontinuities (spaced by about 60°) approximately cancel each other. Moreover, as the number of sections N is increased, the phase shift increases and it becomes approximately 135° for N=4. One then finds, by only using 4 sections, that the loss can be reduced to a few hundreds of dB over 70% of the central zone as shown in FIG. 8. Curve (a) is obtained by choosing for all sections the same phase shift of 135°, and it is characterized by $v_0 = 0.69$, in other words the passband covers 69% of the central zone. Curve (b) has a slightly larger width 0.71 obtained (with some increase in loss) by using a symmetric design with slightly different phase shifts for the first two sections. In both cases the transition loss is close to that of the reduced transition, as shown by curve (c) calculated for the reduced transition corresponding to (b).

Figure 9:
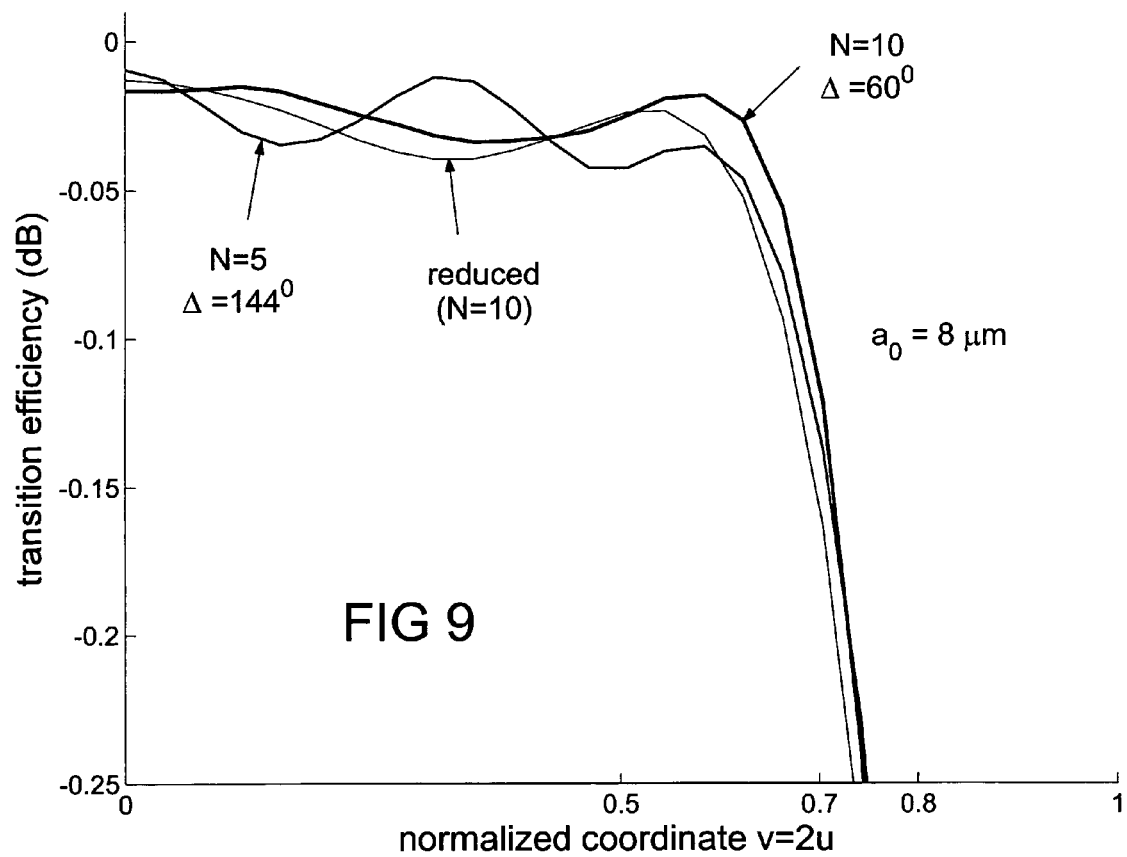
FIG. 9 shows that the passband ripple obtained for N=5 by choosing $\Delta=144°$ can be substantially reduced by choosing $\Delta=60°$ and using twice as many sections.

Next, for N greater than 4, one finds that by choosing $120° < \Delta$ the central region of the passband is afflicted by a ripple, which increases the loss, and it is partially caused by the modes $\Psi_{-2}$, $\Psi_2$. The ripple amplitude increases with N, and for a=8 μm, $L_{2N}=3.5$ μm one obtains for N=5 the behavior shown in FIG. 9 for $\Delta=145°$. On the other hand, the ripple is eliminated by reducing $\Delta$ to 60°. Also shown in FIG. 9 is the reduced transition behavior for $\Delta=60°$, and one can see that it is approximately equivalent to the behavior of the actual transition. This equivalence is important for it implies minimal excitation of higher order modes. Both cases $\Delta=145°,60°$ were calculated assuming for all sections a constant phase shift $\Delta$ and $L_{2N}=3.5$ μm.

Figure 10:
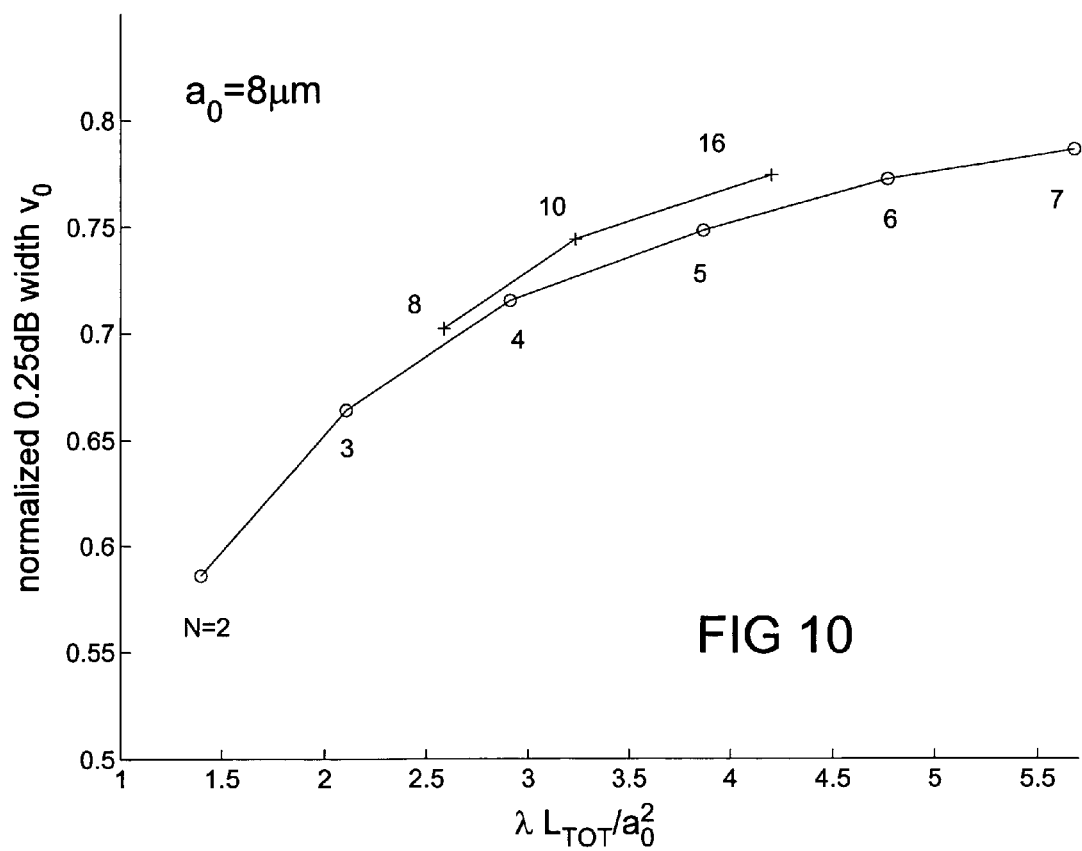
FIG. 10 shows the relationship obtained for $a_0=8$ µm, $\Delta n/n=0.0058$ between the width $v_0$ and the transition parameters (transition length and number of sections).

Next, FIG. 10 shows the relationship obtained for $a_0=8$ μm between the passband width $v_0$ and the normalized transition length $$\frac{\lambda L_{tot}}{a_0^2}$$

for $R \approx \infty$. Notice the optimization produces two distinct curves, characterized respectively by the two conditions $$120° \leq \Delta \quad (17)$$

and $$\Delta \approx 60° \quad (18)$$

The former condition (17) is preferable when the number N of sections is small and the loss must only be reduced in the central region of the central zone. For instance, by only using 4 sections with $\Delta \approx 135°$ we have seen that the transition produces $v_0 \approx 0.70$, corresponding to 70% of the central zone. On the other hand, if a larger width $v_0$ is specified, a larger N is required and better results are realized by using the latter condition (18). In either case, by using the simplest design with a constant phase shift $\Delta$, one obtains for each N an optimum value of $\Delta$ that maximizes $v_0$ and approximately $$\Delta \approx 130°, 130°, 135°, 144°, 147°, 150°, 60°, 60°, 60°$$

for $$N=2, 3, 4, 5, 6, 7, 8, 10, 16$$

Figure 11:
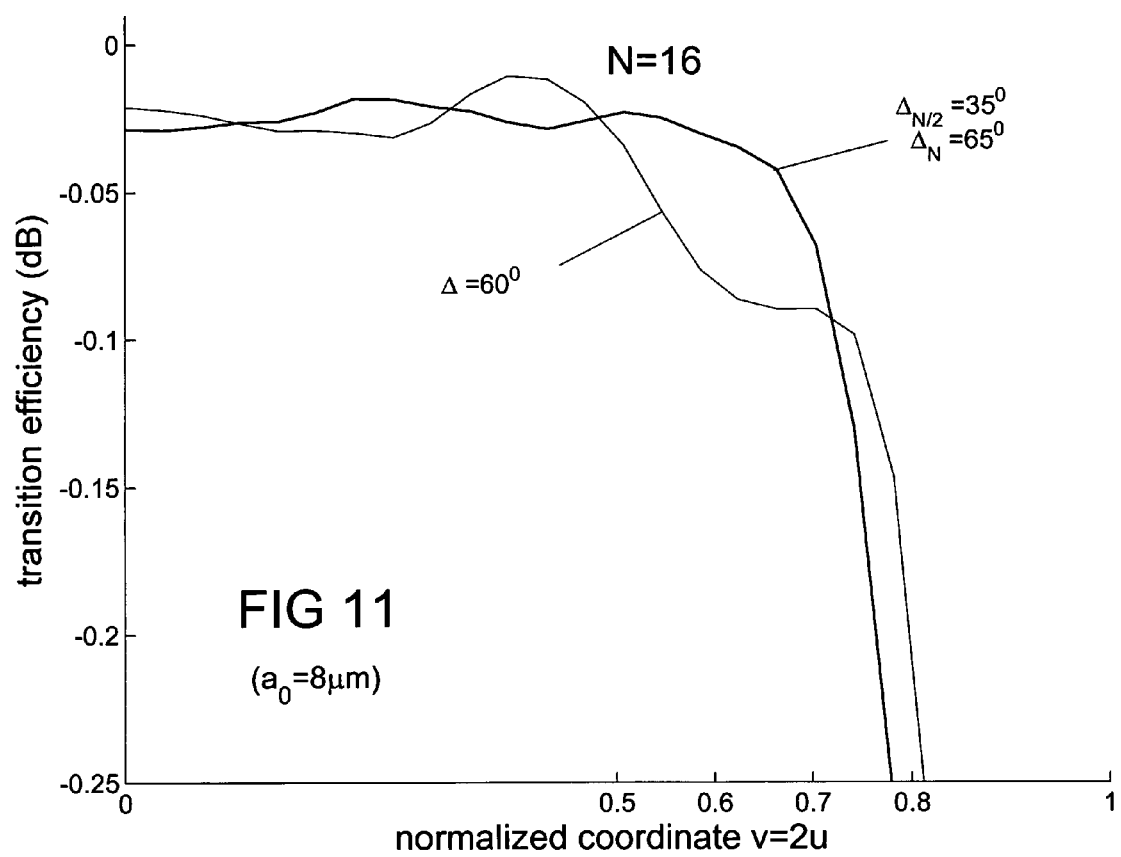
FIG. 11 shows a comparison for N=16 between the loss for $\Delta=60°$ and the loss obtained using the quadratic profile (14).

One also finds that for N>10 the residual loss in the central region of the passband can be further improved by reducing the values of $\Delta_s$ in the central region of the transition, for instance by choosing the quadratic profile (14). For instance, by choosing $\Delta_N=65°$ and $\Delta_{N/2}=35°$ one obtains for N=32 the behavior of FIG. 11. Also shown for comparison is the loss for $\Delta=60°$.

Next, similar results are obtained by increasing the period to $$a_0=10 \text{ μm},$$

Figure 12:
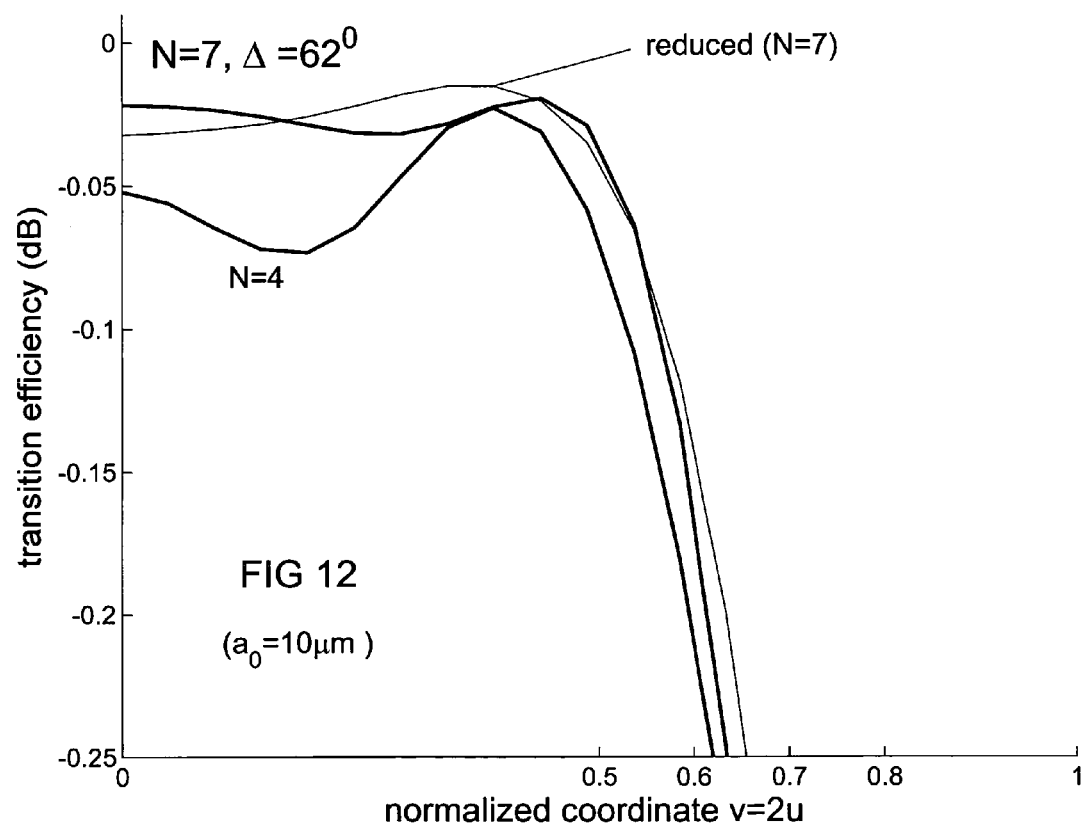
FIG. 12 shows that the passband ripple obtained for N=4 by choosing $\Delta \approx 145°$ can be substantially reduced by choosing $\Delta=62°$ and increasing the number of sections.
Figure 13:
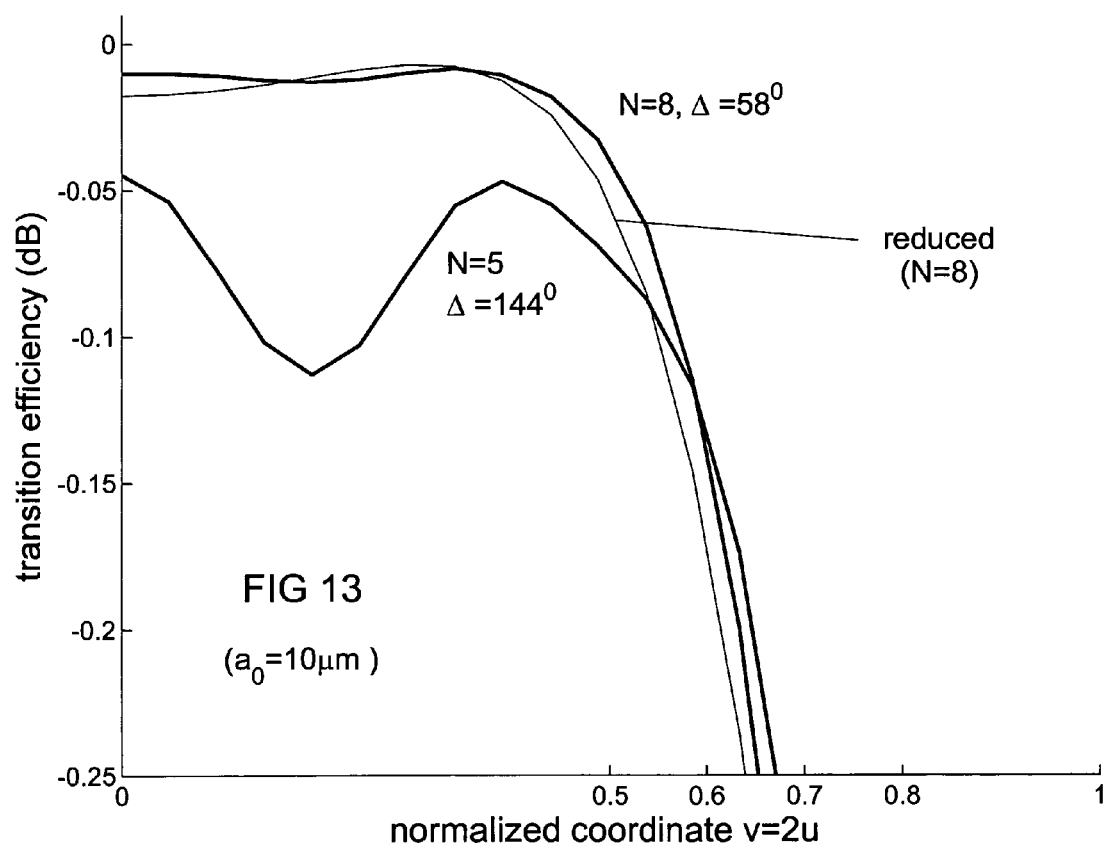
FIG. 13 shows that the passband ripple obtained for N=5 by choosing $\Delta=144°$ can be substantially reduced by increasing the number of sections and choosing $\Delta=58°$

One obtains again the two conditions (17, 18). However, the larger $a_0$ now increases the array V-number, and this generally increases the loss for $v \leq v_1$ and it also reduces the width $v_0$ for a given N. As shown for example in FIG. 12, a relatively large ripple is now produced for N=4 by choosing $\Delta \approx 140°$, and it is therefore preferable in this case to choose N=7 with $\Delta=62°$. Notice the smaller $\Delta$ eliminates the ripple, and it also increases the width $v_0$ as shown in FIG. 12. Also notice the transition for $\Delta=62°$ is approximately equivalent to the reduced transition. Similar results are obtained for larger N. One finds that the ripple amplitude produced by the condition Δ>120° increases with N, and it is therefore again preferable in each case to increase N and choose Δ≈60° as shown in FIG. 13 for N=5.

Figure 14:
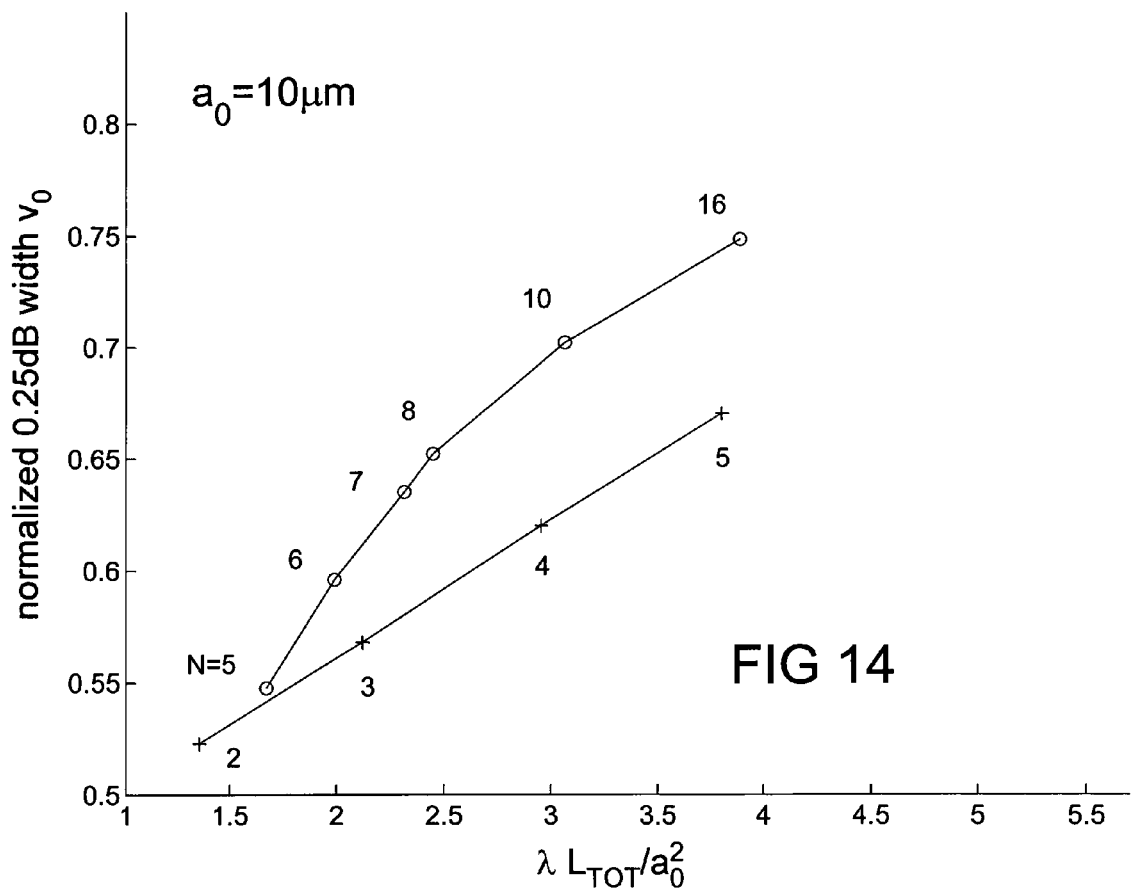
FIG. 14 shows the relationship obtained for $a_0=10$ µm, $\Delta n/n=0.0058$ between the width $v_0$ and the transition parameters.

FIG. 14 shows the relationship between $v_0$ and the normalized transition length for $a_0=10$ μm. The results are similar to those obtained previously for $a_0=8$ μm. We note however two differences. As compared to the results obtained previously, the value of $v_0$ obtained for a particular N is now smaller, because of the larger V-number caused by the larger $a_0$. On the other hand, a desirable result is that the length of each section is now substantially increased, as a consequence of the larger $a_0$, and therefore the effective gap value at the end of the transition is substantially reduced, in all cases where constraint (16) is important (the equality sign is satisfied).

An important feature of the above technique is that it allows (for the first time) very low losses to be realized in the vicinity of the focal point by only using a few sections (for instance less than 5 sections). Another important feature is that very low losses can be realized over more than 60% of the central zone by using a relatively small number of sections characterized by Δ≈60°. For instance, the performance of the new transition is compared in FIGS. 15, 16 to the performance of a conventional transition of the prior art. In both examples the conventional transition consists of 20 sections of identical length L=20 microns. One can see that the new design substantially reduces the loss and, at the same time, it substantially reduces (respectively to 16 and 10) the number of sections.

The importance of choosing the phase shifts close to the optimum values is illustrated in FIG. 17. In this example the number of sections is 10 and the transition is characterized by a constant phase shift Δ of about 59°. One can see that both widths $v_0$ and $v_1$ are strongly reduced, if Δ is chosen appreciably smaller than the optimum value. A similar result is obtained by increasing Δ, but the resulting decrease of $v_0$ is not as strong.

As pointed out earlier, the optimum phase shifts that minimize the loss are approximately independent of the array focal length $R_0$. Therefore, the lengths of the various sections are best determined by initially assuming $R_0=\infty$ (as in FIGS. 5, 6) and then using the expression (9) to determine the actual lengths for a finite $R_0$. According to this expression, the actual lengths differ appreciably from the values calculated for $R_0\approx\infty$, unless $R_0$ is much larger than the total transition length $L_{tot}$. As a consequence, substantially higher loss can result if the lengths calculated for $R_0=\infty$ are used, instead of the actual lengths. An example of the increase in loss is shown in FIG. 18 for a transition characterized by $a_0=10$ μm, Δn/n=0.0058, N=10, $R_0=3500$ μm, $L_{tot}=280$ μm In one case (shown as the optimized case) the lengths are calculated correctly using the expression (9), whereas in the other case the approximate values obtained for $R_0=\infty$ are used. One can see that the loss is substantially higher in the latter case. As pointed out earlier, the dependence of the lengths on the focal length was ignored in the prior art.

Notice, in the general case where the array is characterized by a finite focal length $R_0$ each segment in FIG. 6 becomes a circular segment centered at the focal point. Moreover, as is well known to those skilled in the art, this disclosure applies in general to any planar arrangement accurately described on a plane by the geometry and the effective refractive index distributions disclosed here. Also notice the period a=αR and therefore from the expression (12) one obtains $$\Delta \approx 180° \rho \frac{\lambda L}{(\alpha R)^2}$$

which gives the phase shift Δ in degrees produced by a section of length L located at a distance R form the focal point.

What is claimed is:

1. A planar optical interconnection device comprising:
a periodic transition formed between a slab region and an array of radial waveguides arranged periodically with angular period α and focal point F located in the slab region,
wherein said transition is a sequence of N sections, whose number N can be as small as one, and each section consists of two circular segments, one of which is a slab segment, and the other is an array segment consisting of radial waveguides arranged periodically with non-zero gap regions of lower refractive index between the waveguides,
wherein the radial length L of each section is determined by a design parameter Δ given in degrees by the angle $$\Delta = 180° \rho \frac{\lambda L}{(\alpha R)^2}$$

where R is the average radial distance of the section from the focal point, λ is the wavelength in the slab segment, ρ is a parameter whose value in the last section connected to the slab region is comprised between 1.0 and 1.25, and the value of Δ in the last section either exceeds 110° or is comprised between 50° and 90°.

2. The array of claim 1 wherein each section has value of ρ comprised between 1.0 and 1.5, wherein the variation of ρ as a function of the radial distance R is a monotonic decrease as the section becomes closer to the focal point, and wherein all sections are characterized by Δ comprised between 50° and 90°.

3. The array of claim 1 wherein each section has value of ρ comprised between 1.0 and 1.5, wherein the variation of ρ as a function of the radial distance R is a monotonic decrease as the section becomes closer to the focal point, and wherein all sections are characterized by Δ comprised between 110° and 180°.

4. The array of claim 1 wherein Δ has substantially the same value for all sections, wherein said value of Δ is either greater than 110° or comprised between 50° and 90°,
wherein the variation of ρ along the transition is substantially a linear function of the section index, wherein the section index is an integer that increases from one to N as the section becomes closer to the focal point.

5. The array of claim 1 wherein the variation of Δ along the transition is essentially symmetric with respect to the center of the transition, so that each section located in the first half of the transition has essentially the same value of Δ as the corresponding section symmetrically located with respect to the center of the transition.

6. The array of claim 1 wherein N>3 and the value of Δ at the center of the transition is appreciably smaller than the values at the ends.

7. The array of claim 6 wherein the variation of Δ along the transition is essentially a quadratic function of the section index, wherein the section index is an integer that increases from one to N as the section becomes closer to the focal point.

8. An optical interconnection device comprising:

a periodic transition formed between a slab region and an array of radial waveguides arranged periodically with angular period $\alpha$ and focal point F located in the slab region, wherein said transition is a sequence of N sections, whose number N can be as small as one, and each section consists of two circular segments, one of which is a slab segment, and the other is an array segment consisting of radial waveguides arranged periodically with non-zero gap regions of lower refractive index between the waveguides, wherein each section is characterized by a phase shift $\Delta$ which is determined by the first two unwanted modes of that section and $\Delta$ is equal to the sum of the phase shifts imparted by the two segments of that section to said first two unwanted modes, wherein the phase shift imparted by each segment is equal to the product of the segment length multiplied by the average difference in propagation constant between said two modes and the fundamental mode, and the value of $\Delta$ in the last section either exceeds 110° or is comprised between 50° and 90°.

9. The array of claim 8 wherein all sections are characterized by $\Delta$ comprised between 50° and 90°.

10. The array of claim 8 wherein all sections are characterized by $\Delta$ comprised between 110° and 180°.

11. The array of claim 8 wherein $\Delta$ has substantially the same value for all sections, wherein said value of $\Delta$ is either greater than 110° or comprised between 50° and 90°.

12. The array of claim 8 wherein the variation of $\Delta$ along the transition is essentially symmetric with respect to the center of the transition, so that each section located in the first half of the transition has essentially the same value of $\Delta$ as the corresponding section symmetrically located with respect to the center of the transition.

13. The array of claim 8 wherein N>3 and the value of $\Delta$ at the center of the transition is appreciably smaller than the values at the ends.

14. The array of claim 13 wherein the variation of $\Delta$ along the transition is essentially a quadratic function of the section index, and wherein the section index is an integer that increases from one to N as the section becomes closer to the focal point.

* * * * *